(12) United States Patent
Tsukagoshi

(10) Patent No.: US 9,693,033 B2
(45) Date of Patent: Jun. 27, 2017

(54) TRANSMITTING APPARATUS, TRANSMITTING METHOD, RECEIVING APPARATUS AND RECEIVING METHOD FOR TRANSMISSION AND RECEPTION OF IMAGE DATA FOR STEREOSCOPIC DISPLAY USING MULTIVIEW CONFIGURATION AND CONTAINER WITH PREDETERMINED FORMAT

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 349 days.

(21) Appl. No.: 13/997,448

(22) PCT Filed: Nov. 5, 2012

(86) PCT No.: PCT/JP2012/078637
§ 371 (c)(1),
(2) Date: Jun. 24, 2013

(87) PCT Pub. No.: WO2013/069608
PCT Pub. Date: May 16, 2013

(65) Prior Publication Data
US 2014/0055561 A1    Feb. 27, 2014

(30) Foreign Application Priority Data

Nov. 11, 2011 (JP) ................................ 2011-248114

(51) Int. Cl.
H04N 13/00 (2006.01)
H04N 21/2362 (2011.01)
(Continued)

(52) U.S. Cl.
CPC ....... *H04N 13/0059* (2013.01); *H04N 13/004* (2013.01); *H04N 13/0048* (2013.01);
(Continued)

(58) Field of Classification Search
CPC .............. H04N 19/597; H04N 21/2362; H04N 21/2365; H04N 21/816; H04N 13/0059;
(Continued)

(56) References Cited

U.S. PATENT DOCUMENTS 8,472,731 B2 * 6/2013 Suzuki et al. ................. 382/232
8,982,183 B2 * 3/2015 Jeon et al. ...................... 348/43
(Continued)

FOREIGN PATENT DOCUMENTS

CN    1954606 A    4/2007
CN    101803394 A    8/2010
(Continued)

OTHER PUBLICATIONS

Supplementary European Search Report from EP Application No. 12847913, dated Jul. 4, 2014.
(Continued)

*Primary Examiner* — Francis G Geroleo
(74) *Attorney, Agent, or Firm* — Lerner, David, Littenberg, Krumholz & Mentlik, LLP

(57) ABSTRACT

It is possible to achieve an effective transmission of image data (suppression in the transmission bandwidth and improvement in quality of a reproduced image) in order to cause a stereoscopic image due to a multiview configuration to be observed with the naked eye. Image data of at least a left view and a right view, and image data of an intermediate view located between the left view and the right view, for example, image data of a center view are acquired, among a plurality of views for stereoscopic image display. A container which has a predetermined format and includes a
(Continued)

video stream obtained by coding image data of respective views is transmitted. For example, view configuration information regarding image data in the video stream is inserted into a layer of the video stream.

18 Claims, 31 Drawing Sheets

(51) Int. Cl.
 *H04N 21/2365* (2011.01)
 *H04N 21/81* (2011.01)
 *H04N 21/434* (2011.01)
 *H04N 19/597* (2014.01)
(52) U.S. Cl.
 CPC ....... *H04N 13/0066* (2013.01); *H04N 19/597* (2014.11); *H04N 21/2362* (2013.01); *H04N 21/2365* (2013.01); *H04N 21/4345* (2013.01); *H04N 21/4347* (2013.01); *H04N 21/816* (2013.01)
(58) Field of Classification Search
 CPC ........... H04N 13/0048; H04N 13/0066; H04N 13/4345; H04N 21/4345; H04N 21/4347; H04N 13/004
 USPC .......................................................... 348/43
 See application file for complete search history.

(56) References Cited

U.S. PATENT DOCUMENTS

| | | | |
|---|---|---|---|
| 2003/0095177 A1 | 5/2003 | Yun et al. | |
| 2006/0268987 A1 | 11/2006 | Ha | |
| 2007/0104276 A1* | 5/2007 | Ha ........................... | 375/240.16 |
| 2008/0303893 A1 | 12/2008 | Kim et al. | |
| 2010/0103249 A1* | 4/2010 | Lipton ............... | H04N 13/0022 348/51 |
| 2011/0026809 A1 | 2/2011 | Jeong et al. | |
| 2011/0116762 A1 | 5/2011 | Kato | |
| 2011/0181693 A1* | 7/2011 | Lee et al. ......................... | 348/43 |
| 2011/0202575 A1* | 8/2011 | Frojdh ................. | H04N 19/597 707/803 |
| 2011/0261050 A1* | 10/2011 | Smolic et al. ................. | 345/419 |
| 2012/0194905 A1 | 8/2012 | Ushio et al. | |
| 2013/0038686 A1* | 2/2013 | Chen et al. ...................... | 348/43 |
| 2013/0188013 A1* | 7/2013 | Chen et al. ...................... | 348/43 |
| 2013/0287090 A1* | 10/2013 | Sasaki et al. ............ | 375/240.01 |
| 2014/0071232 A1 | 3/2014 | Tsukagoshi et al. | |
| 2014/0146139 A1* | 5/2014 | Schwartz et al. ............... | 348/43 |
| 2015/0334383 A1 | 11/2015 | Newton et al. | |

FOREIGN PATENT DOCUMENTS

| | | | |
|---|---|---|---|
| CN | 101897195 A | | 11/2010 |
| EP | 2592839 A1 | | 5/2013 |
| JP | 08-009421 A | | 1/1996 |
| JP | 8-0009421 A | | 1/1996 |
| JP | 09-138384 A | | 5/1997 |
| JP | 2004-349731 A | | 12/2004 |
| JP | 2009-004940 A | | 1/2009 |
| JP | 2009-124768 A | | 6/2009 |
| JP | 2010501141 A | | 1/2010 |
| JP | 2010245766 A | | 10/2010 |
| JP | 2011-010255 A | | 1/2011 |
| JP | 2011103589 A | | 5/2011 |
| JP | 2011-519209 A | | 6/2011 |
| JP | 2011-223625 A | | 11/2011 |
| WO | 2005114998 A1 | | 12/2005 |
| WO | 2007066868 A1 | | 6/2007 |
| WO | 2009075418 A1 | | 6/2009 |
| WO | 2009119955 A1 | | 10/2009 |
| WO | 2010067810 A1 | | 6/2010 |
| WO | 2010-116955 A1 | | 10/2010 |
| WO | 2011043022 A1 | | 4/2011 |
| WO | 2011080907 A1 | | 7/2011 |
| WO | 2011103866 A2 | | 9/2011 |
| WO | 2011136239 A1 | | 11/2011 |
| WO | 2012029886 A1 | | 3/2012 |
| WO | 2013069604 A1 | | 5/2013 |

OTHER PUBLICATIONS

Supplementary European Search Report from EP Application No. 12848650, dated Jul. 24, 2014.
Chinese Office Action for CN Application No. 201280004674.8, dated Jan. 20, 2015.
Chinese Office Action for CN Application No. 201280004674.8, dated Aug. 14, 2015.
Japanese Office Action for JP Application No. 2012093399, dated Aug. 25, 2015.
Japanese Office Action for Application No. 2012-148958 dated May 10, 2016.
"Draft Errata List with Revision-Marked Corrections for H.264/AVC", JVT-1050, Thomas Wiegand et al., Joint Video Team (JVT) of ISO/IEC MPEG & ITU-T VCEG, 2003.
Heiko Schwarz, Detlev Marpe, and Thomas Wiegand, "Overview of the Scalable Video Coding Extension of the H.264/AVC Standard", IEEE Transactions on Circuits and Systems for Video Technology, vol. 17, No. 9, Sep. 2007, pp. 1103-1120.
Joint Draft 4.0 on Multiview Video Coding, Joint Video Team of ISO/IEC MPEG & ITU-T VCEG, JVT-X209, Jul. 2007.
Summons to Attend Oral Proceedings Pursuant to Rule 115(1) EPC dated Feb. 15, 2017.
Japanese Office Action for JP Application No. 2012-148958 dated Jan. 31, 2017.

* cited by examiner

FIG. 12

Multiview_stream_configuration_descriptor

| Syntax | No. of Bits | Format |
|---|---|---|
| multiview_stream_configuration_descriptor() { | | |
|   multiview_stream_configuration_tag | 8 | uimsbf |
|   multiview_stream_configuration_length | 8 | uimsbf |
|   multiview_stream_checkflag | 1 | bslbf |
|   reserved | 7 | bslbf |
| } | | |

FIG. 13

Semantics of multiview_stream_configuration_descriptor

| | |
|---|---|
| multiview_stream_checkflag (1) | Specifying if the 3D service is made of multiple streams and the information is embedded in video stream. If multiview_stream_checkflag is set to '1', decoder is supposed to check userdata_for_multiview_stream_configuration in video stream. If multiview_stream_checkflag is reset to '0', no guidance is noted. |

FIG. 14

SYNTAX OF Multiview_stream_configuration_info()

| Syntax | No. of Bits | Format |
|---|---|---|
| multiview_stream_configuration_info() { | | |
| reserved | 7 | bslbf |
| 3D_flag | 1 | bslbf |
| if (3D_flag){ | | |
| view_count | 4 | bslbf |
| single_view_es_flag | 1 | bslbf |
| view_interleaving_flag | 1 | bslbf |
| if(!view_interleaving_flag) { | | |
| reserved | 4 | bslbf |
| view_allocation | 4 | bslbf |
| } | | |
| else { | | |
| reserved | 4 | bslbf |
| view_pair_position_id | 3 | bslbf |
| view_interleaving_type | 1 | bslbf |
| } | | |
| indication_of_picture_size_scaling_horizontal | 4 | bslbf |
| indication_of_picture_size_scaling_vertical | 4 | bslbf |
| display_flag | 1 | bslbf |
| reserved | 1 | bslbf |
| } | | |
| } | | |

FIG. 15    multiview_stream_configuration_info semantics

3D_flag    (1)
    INDICATE WHETHER VIDEO TO BE ENCODED CONSTITUTES 3D.
    '1'    A PART OF 3D
    '0'    NOT A PART OF 3D
View_count    (4)
    INDICATE THE NUMBER OF views CONSTITUTING 3D SERVICE. MINIMUM VALUE 1, MAXIMUM VALUE 15.
single_view_es_flag    (1)
    INDICATE WHETHER A PLURALITY OF pictures CONFIGURED OF DIFFERENT views ARE ENCODED WITHIN 1AU, IN ONE ES.
    WHEN ONLY ONE picture SUBJECTED TO view interleaving IS PRESENT IN 1AU, IT BECOMES "1".
    '1'    ENCODE ONLY ONE view IN 1ES.
    '0'    ENCODE TWO OR MORE views IN 1ES.
           WHEN base AND dependent stream OF MVC ARE ENCODED IN ONE ES, IT BECOMES "0".
View_interleaving_flag    (1)
    INDICATE WHETHER A PLURALITY OF view data IN ONE picture IS INTERLEAVED.
    '1'    interleaved. INDICATES THAT TWO views CONSTITUTE SPLIT SCREEN.
    '0'    NOT interleaved
view_allocation    (4)
    INDICATE view ALLOCATION IN THE view STREAM
    0000    center view
    0001    1st left view next to center
    0010    1st right view next to center
    0011    2nd left view next to center
    0100    2nd right view next to center
    0101    3rd left view next to center
    0110    3rd right view next to center
    0111    4th left view next to center
    1000    4th right view next to center
    other values    reserved

FIG. 16 multiview_stream_configuration_info semantics

| | | |
|---|---|---|
| view_pair_position_id | (3) | INDICATE RELATIVE view POSITION OF TWO views IN ALL views.<br>(EARLY POSITION IN SCAN ORDER IS SET TO Left AND LATE POSITION IN SCAN ORDER IS SET TO right) |
| | 000 | INDICATES PAIR OF TWO views LOCATED BOTH ENDS |
| | 001 | INDICATES PAIR OF TWO views LOCATED ONE FURTHER INSIDE THAN BOTH ENDS |
| | 010 | INDICATES PAIR OF TWO views LOCATED TWO FURTHER INSIDE THAN BOTH ENDS |
| | 011 | INDICATES PAIR OF TWO views LOCATED THREE FURTHER INSIDE THAN BOTH ENDS |
| | 100 | INDICATES PAIR OF TWO views LOCATED FOUR FURTHER INSIDE THAN BOTH ENDS |
| | others | reserved |
| view_interleaving_type | (1) | INDICATES INTERLEAVE type. |
| | '1' | Side-by-Side |
| | '0' | Top&Bottom |

FIG. 17 display_flag (1)
INDICATES WHETHER view IS REQUIRED TO BE DISPLAYED WHEN IMAGE DISPAY IS PERFORMED.
'1'   REQUIRED TO BE DISPLAYED
'0'   NOT REQUIRED TO BE DISPLAYED indication_of_picture_size_scaling_horizontal (4)
INDICATES HORIZONTAL PIXEL RATIO OF DECODED IMAGE WITH RESPECT TO FULL HD(1920).
'0000'   100 %
'0001'   80 %
'0010'   75 %
'0011'   66 %
'0100'   50 %
'0101'   33 %
'0110'   25 %
'0111'   20 %
others   reserved indication_of_picture_size_scaling_vertical (4)
INDICATES VERTICAL PIXEL RATIO OF DECODED IMAGE WITH RESPECT TO FULL HD(1080).
'0000'   100 %
'0001'   80 %
'0010'   75 %
'0011'   66 %
'0100'   50 %
'0101'   33 %
'0110'   25 %
'0111'   20 %
others   reserved

FIG. 18

View position various example

| | |
|---|---|
| (1) THE NUMBER OF Views IS 2, AND view pair IS LOCATED IN ONLY BOTH ENDS | view_count=2<br>view_pair_position_id= 000 |
| (2) THE NUMBER OF Views IS 4, AND view pair IS view PAIR LOCATED IN BOTH ENDS | view_count=4<br>view_pair_position_id= 000 |
| (3) THE NUMBER OF Views IS 4, AND view pair IS view PAIR LOCATED ONE FURTHER INSIDE THAN BOTH ENDS (*) | view_count=4<br>view_pair_position_id= 001 |
| (4) THE NUMBER OF Views IS 5, AND view pair IS view PAIR LOCATED IN BOTH ENDS | view_count=5<br>view_pair_position_id= 000 |
| (5) THE NUMBER OF Views IS 9, AND view pair IS view PAIR LOCATED IN BOTH ENDS | view_count=9<br>view_pair_position_id= 000 |
| (6) THE NUMBER OF Views IS 9, AND view pair IS view PAIR LOCATED ONE FURTHER INSIDE THAN BOTH ENDS (*) | view_count=9<br>view_pair_position_id= 010 |

FIG. 19
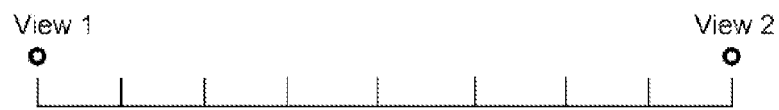
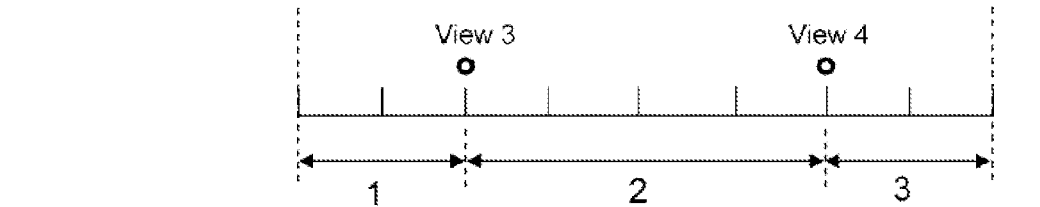

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

(b)

| Syntax | No. of Bits | Format |
|---|---|---|
| userdata_for_multiview_stream_configuration( ) { | | |
| userdata_id | 16 | uimslbf |
| Multiview_stream_configuration_length | 8 | bslbf |
| Multiview_stream_configuration_info( ) | | |
| } | | |

FIG. 23

(a)
```
user_data() {
    user_data_start_code                                          32
    Stereo_Video_Format_Signaling_identifier                      32
    while( nextbits() != '0000 0000 0000 0000 0000 0000 0000 0001' ) {
        Multiview_stream_configuration()
    }
    next_start_code()
}
```

(b)

| Syntax | No. of Bits | Identifier |
|---|---|---|
| Multiview_stream_configuration() { | | |
|     Multiview_stream_configuration_Length | 8 | uimsbf |
|     Multiview_stream_configuration_info() | | |
| } | | |

FIG. 28

| RESOLUTION OF DECODED IMAGE DATA | 960 * 1080 | 1920 * 1080 | 1920 * 2160 |
|---|---|---|---|
| MONITOR RESOLUTION | 1920 * 1080 | 1920 * 1080 | 3840 * 2160 |
| NUMBER OF VIEWS TO BE DISPLAYED | 4 | 4 | 8 |
| SCALING RATIO | 1/2 | 1/4 | 1/4 |

TRANSMITTING APPARATUS, TRANSMITTING METHOD, RECEIVING APPARATUS AND RECEIVING METHOD FOR TRANSMISSION AND RECEPTION OF IMAGE DATA FOR STEREOSCOPIC DISPLAY USING MULTIVIEW CONFIGURATION AND CONTAINER WITH PREDETERMINED FORMAT

CROSS-REFERENCE TO RELATED APPLICATIONS

The present application is a national phase entry under 35 U.S.C. §371 of International Application No. PCT/JP2012/078637 filed Nov. 5, 2012, published on May 16, 2013 as WO 2013/069608 A1, which claims priority from Japanese Patent Application No. JP 2011-248114 filed in the Japanese Patent Office on Nov. 11, 2011.

TECHNICAL FIELD

The present technology relates to a transmission device, a transmission method, a reception device and a reception method, and particularly to a transmission device and the like which allow a reception side to favorably observe a stereoscopic image (three-dimensional image) with the naked eye.

BACKGROUND ART

In general, various systems that display three-dimensional images (stereoscopic images) are known. For example, as described in PTL 1, a method is known which alternately displays left-eye images and right-eye images with disparities therebetween at predetermined intervals on a display, and in which the left-eye images and the right-eye images are observed by an observer wearing shutter glasses with a liquid crystal shutter driven synchronously with the display.

CITATION LIST

Patent Literature

PTL 1: Japanese Unexamined Patent Application Publication No. 9-138384

SUMMARY OF INVENTION

Technical Problem

As a method of enabling a three-dimensional image (stereoscopic image) to be observed with the naked eye, a method using a multiview configuration having N views is considered. In this case, if image data of all views is transmitted, there is a concern that transmission bandwidth will be increased. Therefore, a method is considered in which image data of one or more views, for example, two views is transmitted instead of transmitting image data of all views, and a reception side generates image data of views other than the transmitted views through an interpolation process.

FIG. 31 illustrates a configuration example of an image transmitting and receiving system 50 in this case. On the transmission side, for example, image data of two views is selected in a view selector 52 from image data of N views (View 1, . . . , and View N) that are captured and obtained by N cameras 51-1 to 51-N. Then, for example, two video streams (1st video and 2nd video) obtained by coding the image data of two views in an encoder 53 are sent towards a reception side.

Further, on the reception side, two video streams transmitted from the transmission side are decoded by the decoder 54 and image data of two views is obtained. Then, an interpolation process is carried out in an interpolation process unit 55 based on the image data of two views, and thus image data of other views that are not transmitted is generated. As a result, image data of N views (View 1, . . . , and View N) is obtained. This enables a three-dimensional image (stereoscopic image) configured of image data of N views to be observed with the naked eye on the reception side.

For example, a method for transmitting image data of two views includes the following two methods: (1) a method for transmitting image data of two views at both ends among N views, (2) a method for transmitting image data of an inner two views among N views.

In the transmission method of (1), if the number of multi-views is increased, relative disparity between two views at both ends to be transmitted is enlarged. Therefore, an interpolation becomes difficult around an occlusion accompanied by a processing of a small part when image data of views that are not transmitted is interpolated, and thereby there is a problem in the quality of a reproduced image.

FIG. 32 schematically illustrates the display on the reception side in a case of setting the number of views to 5 in the transmission method. Here, "View_0" indicates a center view, "View_1" indicates a first right view next to center, "View_2" indicates a first left view next to center, "View_3" indicates a second right view next to center, that is, a right view, and "View_4" indicates a second left view next to center, that is, a left view. In this case, only image data of views of "View_3" and "View_4" is transmitted from the transmission side, the image data of views of "View_3" and "View_4" is received on the reception side, and image data of views of "View_0", "View_1", and "View_2" is obtained through an interpolation process. Then, the images of these five views is synthesized and displayed on the display on the reception side in order to cause the three-dimensional image (stereoscopic image) to be observed with the naked eyes. In addition, a lenticular lens is shown in FIG. 32, but a parallax barrier may be used instead thereof. The same is applied in the following FIG. 33.

In the transmission method of (2), image data of a so-called a general stereo view is transmitted, and image data of views that are not transmitted is interpolated on the reception side. At this time, the interpolation of image data of views located inward from two views constituting a stereo view may be synthesized through an interpolation process. However, the interpolation of image data of views located outward from the stereo view is synthesized through an extrapolation process. In the synthesis by extrapolation, since it is difficult to maintain a high quality with respect to an endpoint processing such as an occlusion, it becomes a cause of image degradation.

FIG. 33 schematically illustrates a display on the reception side in a case of setting the number of views to 5 in the transmission method. Here, "View_0" indicates a center view, "View_1" indicates a first right view next to center, "View_2" indicates a first left view next to center, "View_3" indicates a second right view next to center, that is, a right view, and "View_4" indicates a second left view next to center, that is, a left view. In this case, only image data of views of "View_1" and "View_2" is transmitted from the transmission side, and the image data of views of "View_1" and "View_2" is received on the reception side, image data of views of "View_0", "View_3", and "View_4" is obtained through an interpolation process. Then, the images of these five views is synthesized and displayed on the display on the reception side in order to cause the three-dimensional image (stereoscopic image) to be observed with the naked eyes.

An object of the present technology is to effectively transmit image data in order to cause a stereoscopic image due to a multiview configuration to be observed with the naked eyes.

Solution to Problem

The concept of the present technology is a transmission device including an image data acquisition unit that acquires image data of at least a left view and a right view, and image data of an intermediate view located between the left view and the right view, among a plurality of views for stereoscopic image display, and an image data transmitting unit that transmits a container which has a predetermined format and includes a video stream obtained by coding the acquired image data.

In the present technology, image data of at least a left view and a right view and image data of an intermediate view located between the left view and the right view, for example, image data of a center view, among a plurality of views for stereoscopic image display are acquired by the image data acquisition unit. For example, in this case, the image data is image data that is captured by a camera and obtained, read out from a recording medium and obtained, or the like.

A container which has a predetermined format and includes a video stream obtained by coding the acquired image data is transmitted by the image data transmitting unit. For example, the container may be a transport stream (MPEG-2 TS) used as a digital broadcasting standard. Further, for example, the container may be MP4 used for internet distribution, or a container having other formats.

For example, in the video stream included in the container, image data of the left view and the right view may be respectively coded as data of a single picture. Further, for example, in the video stream included in the container, image data of the left view and the right view may be interleaved and coded as data of a single picture.

Further, for example, the video stream included in the container may include data of one or a plurality of pictures. In this case, for example, when the video stream included in the container includes coded data of the plurality of pictures, information indicating a boundary between coded data of each picture may be disposed. The information indicating the boundary is disposed in this manner, and thus it is possible to instantaneously access leading data of each picture.

In this manner, in the present technology, image data of at least a left view and a right view and image data of an intermediate view located between the left view and the right view, among a plurality of views for stereoscopic image display are transmitted. Accordingly, it is possible to effectively transmit image data in order to cause a stereoscopic image due to a multiview configuration to be observed with the naked eyes.

That is, since not only the image data of the left view and the right view, but also the image data of the intermediate view is transmitted, a relative disparity between views is small. An interpolation becomes easy around an occlusion accompanied by a processing of a small part when image data of other views is interpolated, and thereby it is possible to improve the quality of a reproduced image. Further, the image data of the left view and the right view is transmitted, the interpolation of the image data of the views that are not transmitted may be synthesized through all interpolation processes, and thus it is easy to maintain a high quality with respect to the endpoint processing such as the occlusion.

In addition, the present technology may be configured to further include, for example, a view configuration information insertion unit that inserts view configuration information regarding image data in the video stream, into a layer of the video stream. The view configuration information enables an appropriate and efficient process to cause a three-dimensional image (stereoscopic image) formed of image data of a plurality of views to be observed with the naked eyes, on the reception side.

In this case, for example, the present technology may be configured to further include an identification information insertion unit that inserts identification information for identifying whether or not the view configuration information is inserted into the layer of the video stream, into a layer of the container. It is possible to easily identify whether the view configuration information is inserted into the layer of the video stream based on the identification information, on the reception side.

For example, when image data of a predetermined view is coded as data of a single picture in the video stream included in the container, information indicating a position of the predetermined view may be included in the view configuration information inserted into the layer of the video stream.

Further, for example, when image data of two views is interleaved and coded as data of a single picture in the video stream included in the container, information indicating positions of the two views may be included in the view configuration information inserted into the layer of the video stream. In this case, for example, information indicating a type of an interleaving process performed on the image data of the two views may be further included in the view configuration information.

Further, for example, information indicating whether or not data of a plurality of pictures is coded in one access unit of the video stream may be included in the view configuration information inserted in the layer of the video stream. Further, for example, information indicating whether or not image data of views required for image display is coded in the video stream may be included in the view configuration information inserted into the layer of the video stream. Further, for example, pixel ratio information regarding a predetermined horizontal and/or vertical resolution may be included in the view configuration information inserted into the layer of the video stream.

Further, the present technology may be configured to further include, for example, a disparity data acquisition unit that acquires disparity data between the respective views and the image data transmitting unit transmits a container which has a predetermined format and includes a disparity stream obtained by coding the acquired disparity data in addition to a video stream obtained by coding the acquired image data. In this case, on the reception side, it is possible to easily perform an interpolation synthesis on image data of respective views that are not transmitted, based on the disparity data that is transmitted, without performing a process of generating the disparity data from image data of the respective views that are received.

Further, another concept of the present technology is a reception device including an image data receiving unit that receives a container which has a predetermined format and includes a video stream obtained by coding image data of at least a left view and a right view, and image data of an intermediate view located between the left view and the right view, among a plurality of views for stereoscopic image display, an image data acquisition unit that acquires image data of respective views by decoding a video stream included in the container, and an interpolation process unit that acquires image data of a predetermined number of views located between the respective views through an interpolation process, based on disparity data between the respective views.

In the present technology, a stream which has a predetermined format and includes a video stream obtained by coding image data of at least a left view and a right view, and image data of an intermediate view located between the left view and the right view, among a plurality of views for stereoscopic image display is received by the image data receiving unit. By the image data acquisition unit, a video stream included in the stream is decoded and image data of respective views is obtained. Then, by the interpolation process unit, the image data of a predetermined number of views located between the respective views is acquired through the interpolation process, based on disparity data between the respective views.

For example, the container may include a disparity stream obtained by coding the disparity data, and the reception device may further include a disparity data acquisition unit that acquires the disparity data by decoding the disparity stream included in the container. Further, for example, the reception device may further include a disparity data generation unit that generates the disparity data, based on image data of the respective views obtained by the image data acquisition unit.

In this manner, in the present technology, image data of at least a left view and a right view and image data of an intermediate view located between the left view and the right view, among a plurality of views for stereoscopic image display are received, and other views are obtained through the interpolation process based on the disparity data. Therefore, it is possible to favorably cause a stereoscopic image due to a multiview configuration to be observed with the naked eyes.

That is, since not only the image data of the left view and the right view, but also the image data of the intermediate view between the left view and the right view is transmitted, a relative disparity between views is small, an interpolation becomes easy around an occlusion accompanied by a processing of a small part when image data of views that are not transmitted is interpolated, and thereby it is possible to improve the quality of a reproduced image. Further, the image data of the left view and the right view is received, the interpolation of the image data of the view that is not transmitted may be synthesized through all interpolation processes, and thus it is easy to maintain a high quality with respect to the endpoint processing such as the occlusion.

Advantageous Effects of Invention

According to the present technology, it is possible to effectively transmit image data in order to cause a stereoscopic image due to a multiview configuration to be observed with the naked eyes.

BRIEF DESCRIPTION OF DRAWINGS

FIG. 12 is a diagram illustrating a structural example of a multiview stream configuration descriptor as identification information.

FIG. 13 is a diagram illustrating content of main information in the structural example of a multiview stream configuration descriptor.

FIG. 14 is a diagram illustrating a structural example of multiview stream configuration information as view configuration information.

FIG. 15 is a diagram illustrating content of main information in the structural example of multiview stream configuration information.

FIG. 16 is a diagram illustrating content of main information in the structural example of multiview stream configuration information.

FIG. 17 is a diagram illustrating content of main information in the structural example of multiview stream configuration information.

FIG. 18 is a diagram illustrating an example of a relationship between the number of views indicated by "view_count" and positions of two views indicated by "view_pair_position_id."

FIG. 19 is a diagram illustrating a generation example of disparity data on a transmission side or a reception side, in a case of transmitting image data of a pair of two views at both ends and image data of a pair of two views located inward from both ends.

FIG. 22 is a diagram illustrating structural examples of "Multiview stream configuration SEI message" and "user-data_for_multiview_stream_configuration( )."

FIG. 23 is a diagram illustrating a structural example of "user_data( )."

FIG. 28 is a diagram illustrating a calculation example of a scaling ratio.

DESCRIPTION OF EMBODIMENTS

Figure 1:
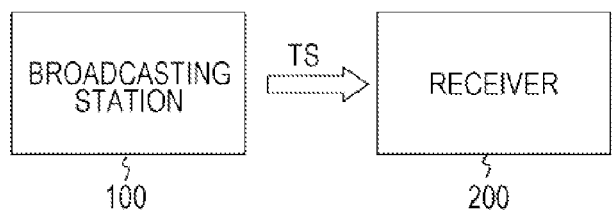
FIG. 1 is a block diagram illustrating a configuration example of an image transmitting and receiving system as an embodiment.

A mode for carrying out the invention (hereinafter, referred to as "embodiment") will be described below. In addition, the description will be given in the following order.
1. Embodiment
2. Modification example 1. Embodiment Image Transmitting and Receiving System FIG. 1 illustrates a configuration example of an image transmitting and receiving system 10 as an embodiment. The image transmitting and receiving system 10 is configured of a broadcasting station 100 and a receiver 200. The broadcasting station 100 transmits a transport stream TS as a container carried on a broadcast wave.

A video stream obtained by coding image data of at least a center view, a left view and a right view among a plurality of views for stereoscopic image display is included in the transport stream TS. In this case, the center view forms an intermediate view located between the left view and the right view.

Figure 2:
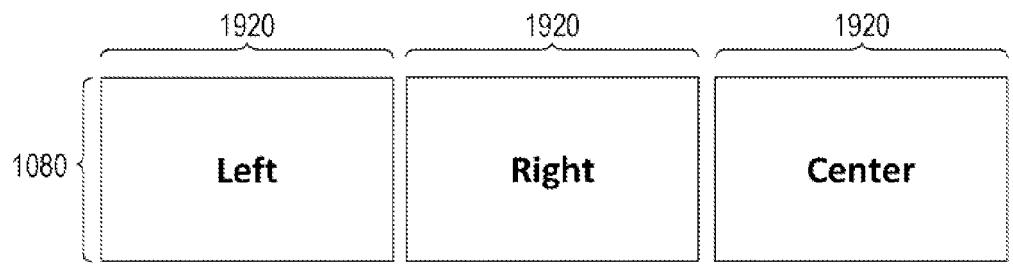
FIG. 2 is a diagram illustrating an example in which image data of each of center, left and right views is respectively coded as data of a single picture.

In a video stream included in the transport stream TS, as shown in FIG. 2, the image data of the center view, the left view and the right view is respectively coded as data of a single picture. In an illustrated example, the data of each picture has a full HD size of 1920*1080.

Figure 3:
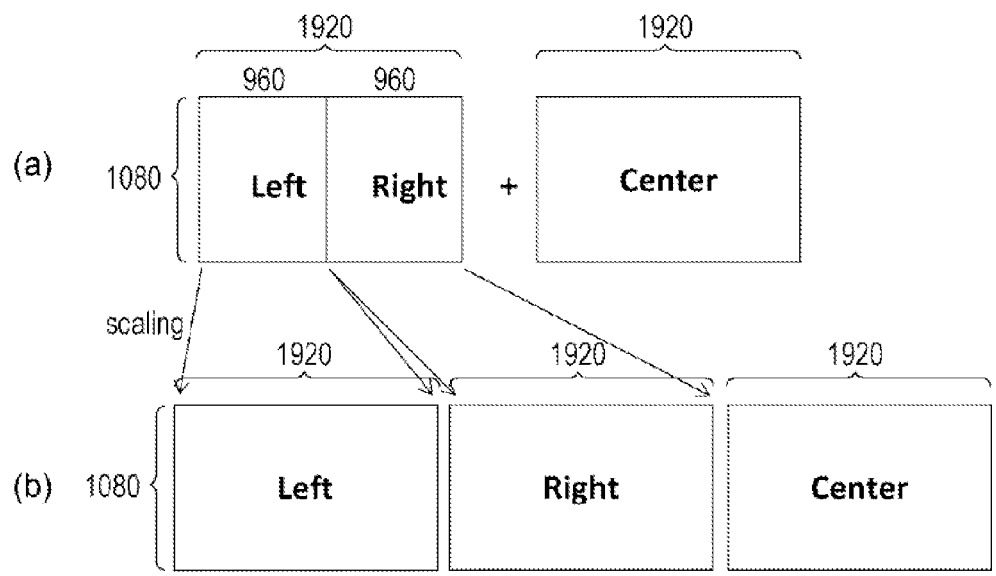
FIG. 3 is a diagram illustrating an example in which image data of the center view is coded as data of a single picture, and image data of two views of the left view and the right view is interleaved and coded as data of a single picture.

Alternatively, in a video stream included in the transport stream TS, as shown in FIG. 3(a), the image data of the center view is coded as data of a single picture and the image data of the left view and the right view is interleaved and coded as data of a single picture. In an illustrated example, the data of each picture has a full HD size of 1920*1080.

In addition, in a case where the image data of the left view and the right view is interleaved and coded as data of a single picture, the image data of each view becomes in a state of being thinned out to ½ in a horizontal direction or a vertical direction. In an illustrated example, the type of an interleaving process is side_by_side, and the size of each view is 960*1080. Although not shown, top_and_bottom may be considered as the type of the interleaving process, and in that case, the size of each view is 1920*540.

In a case where the image data of the left view and the right view is interleaved and coded as data of a single picture, on the reception side, as shown in FIG. 3(b), a scaling process is performed, and thus the size of the image data of the left view and the right view returns to the size of full HD of 1920*1080.

The video stream included in the transport stream TS includes data of one or a plurality of pictures. For example, the following three video streams (video elementary streams) are included in the transport stream TS. That is, the video stream obtained by coding the image data of the center view, the left view and the right view as a single picture is included.

Further, for example, the following two video streams (video elementary streams) are included in the transport stream TS. That is, it is the video stream obtained by coding the image data of the center view as a single picture and the video stream obtained by interleaving and coding image data of the left view and the right view as a single picture.

Further, for example, the following one video stream (video elementary stream) is included in the transport stream TS. That is, data obtained by respectively coding the image data of the center view, the left view and the right view as data of a single picture is included in the one video stream.

Figure 4:
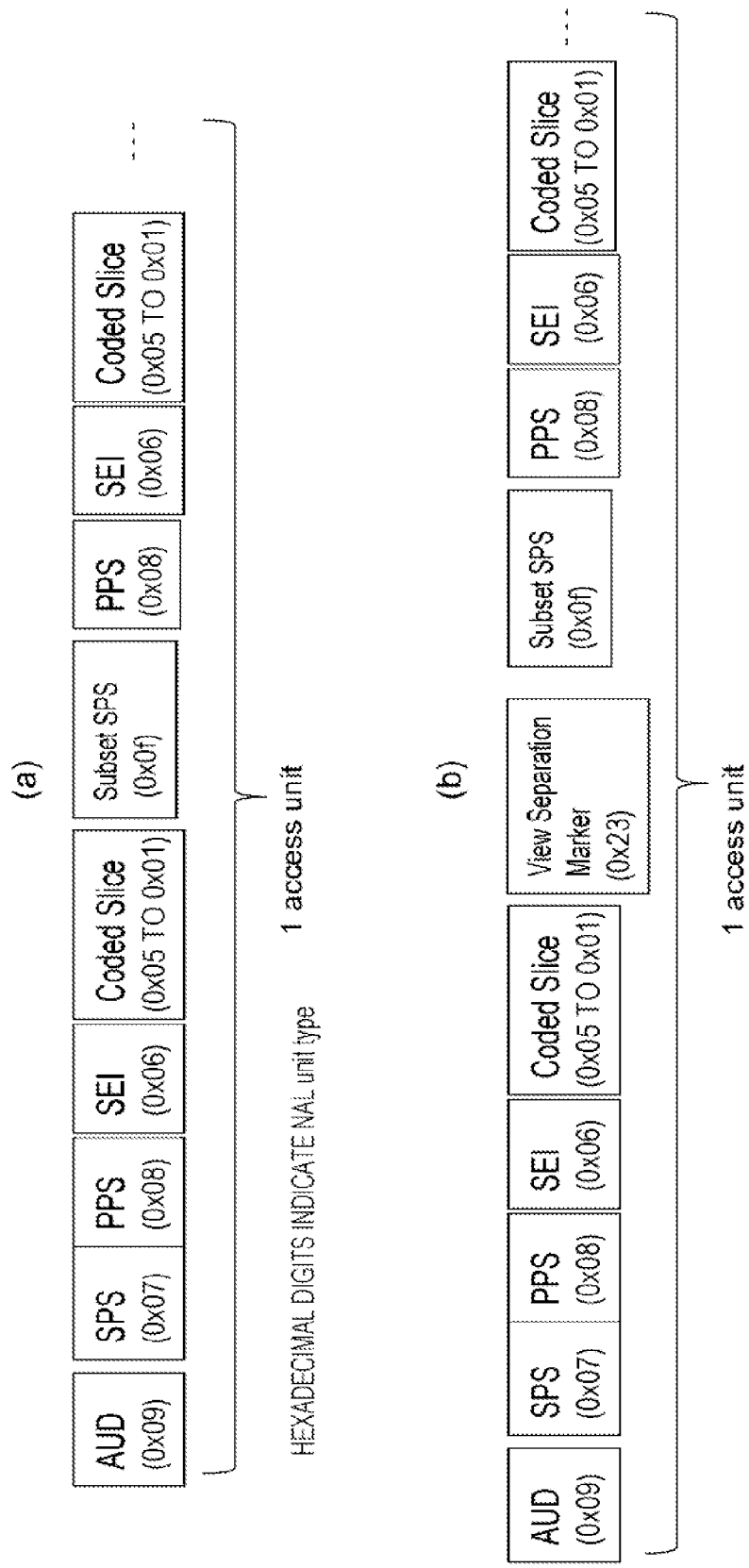
FIG. 4 is a diagram illustrating an example of a video stream including coded data of a plurality of pictures.

FIGS. 4(a) and 4(b) illustrate examples of video streams including coded data of a plurality of pictures. Coded data of each picture is sequentially disposed in each access unit. In this case, coded data of a first picture is formed of "SPS to Coded Slice," and coded data of a second and the subsequent pictures are formed of "Subset SPS to Coded Slice." In addition, pictures are coded by MPEG4-AVC in this example, but this example may be adopted in other coding systems. In addition, hexadecimal digits in this drawing indicate "NAL unit type."

In a case where coded data of each picture coexists in one video stream, being able to immediately identify the boundary between respective pictures is required. Then, it is possible to attach an access unit delimiter (AUD) to only a leading part of an access unit. Therefore, as shown in FIG. 4(b), it is considered that a new "NAL unit" called a "View Separation Marker" for indicating a boundary is defined and disposed between coded data of each picture. This enables an immediate access to leading data of each picture. In addition, FIG. 4(a) illustrates an example in which "View Separation Marker" is disposed between data of two views.

Figure 5:
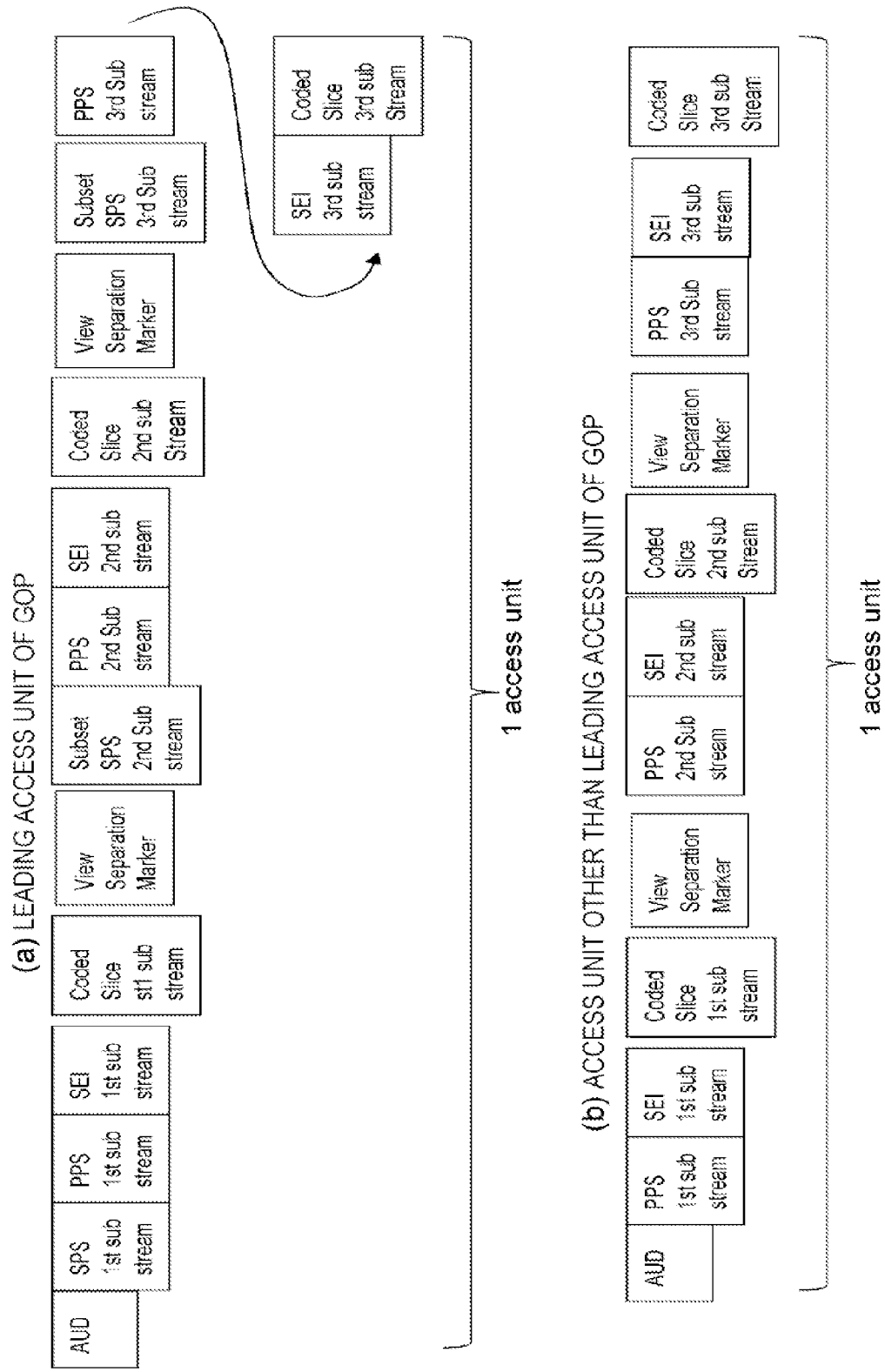
FIG. 5 is a diagram illustrating an example of a case in which coded data of three pictures coexist in one video stream.

FIGS. 5(a) and 5(b) illustrate examples in which coded data of three pictures coexist in one video stream. Here, coded data of each picture is shown as a substream. FIG. 5(a) illustrates a leading access unit of Group of Pictures (GOP), and FIG. 5(b) illustrates an access unit other than the leading access unit of GOP.

View configuration information regarding image data in the video stream is inserted into the layer of the video stream (such as a picture layer and a sequence layer). The view configuration information includes information indicating a view of which image data is included in the video stream, and information indicating whether or not data of a plurality of pictures is coded in one access unit of the video stream. The view configuration information is inserted into, for example, a user data area or the like of a picture header or a sequence header of a video stream. Based on the view configuration information, the reception side may perform an appropriate and efficient process for causing a three-dimensional image (stereoscopic image) of image data of a plurality of views to be observed with the naked eyes. The details of the view configuration information will be described later.

Further, identification information for identifying whether or not the view configuration information is inserted into the layer of the video stream, is inserted into the layer of the transport stream TS. The identification information is inserted, for example, under video elementary loop (video ESloop) of a Program Map Table (PMT) included in the transport stream TS, or an event information table (EIT). A reception side may easily identify whether or not the view configuration information is inserted into the layer of the video stream based on the identification information. The details of the identification information will be described later.

The receiver 200 receives the transport stream TS which is carried on a broadcast wave and transmitted from the broadcasting station 100. In addition, the receiver 200 decodes video streams included in the transport stream TS to acquire image data of a center view, a left view, and a right view. At this time, the receiver 200 may know a view position at which the image data is included in each video stream, based on view configuration information included in the layer of the video stream.

The receiver 200 acquires image data of a predetermined number of views located between the center view and the left view and between the center view and a right view through an interpolation process based on disparity data between the center view and the left view and disparity data between the center view and the right view. At this time, the receiver 200 may know the number of views based on the view configuration information included in the layer of the video stream, and thus may easily recognize positions to which views are not transmitted.

The receiver 200 decodes a disparity data stream which is transmitted together with the video stream from the broadcast station 100 to acquire the aforementioned disparity data. Alternatively, the receiver 200 generates the aforementioned disparity data based on the acquired image data of the center, left, and right views.

The receiver 200 synthesizes and displays images of the respective views on a display in order to cause three-dimensional images (stereoscopic images) to be observed with the naked eye, based on the image data of each of the center, left and right views that are transmitted from the broadcasting station 100 and the image data of respective views acquired through the aforementioned interpolation process.

Figure 6:
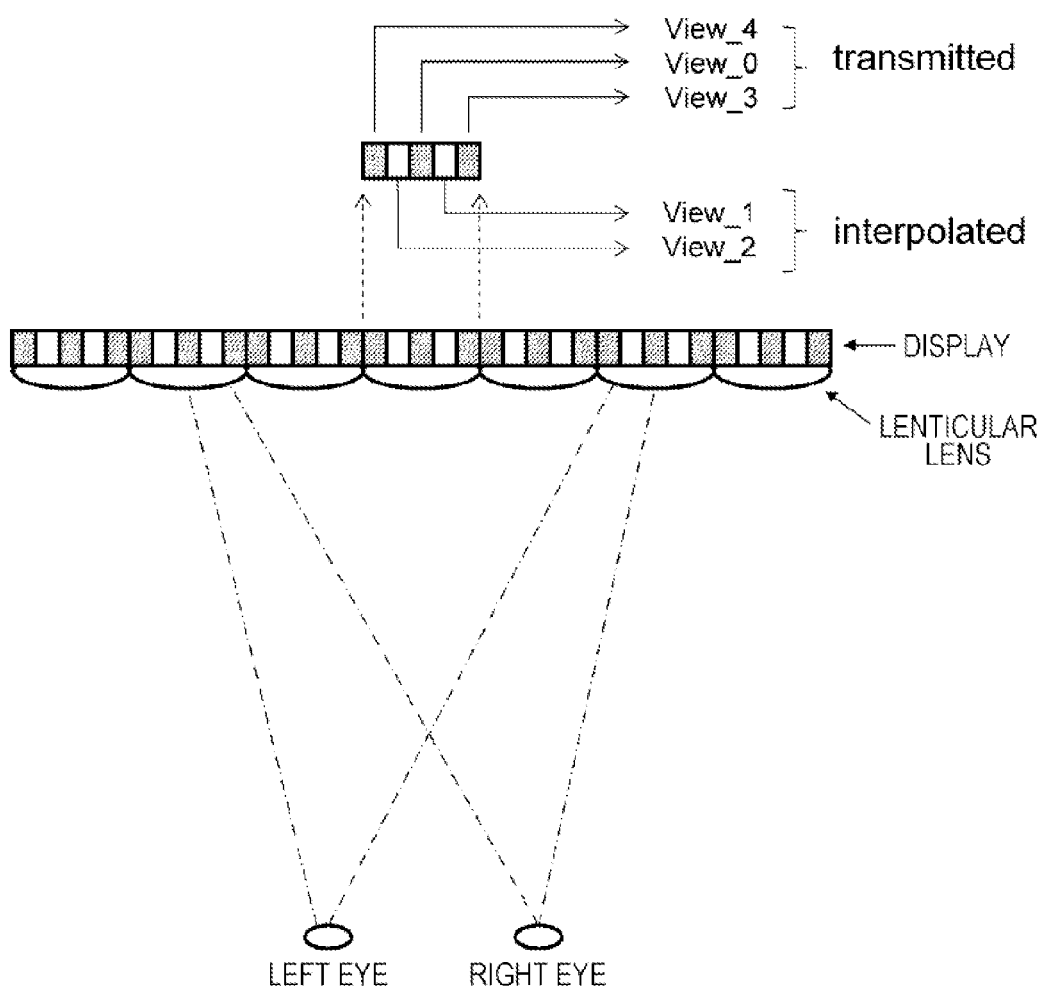
FIG. 6 is a diagram schematically illustrating display of a receiver in a case where the number of views is 5, in a method of transmitting image data of a left view, a right view, and a center view located therebetween among N views.

FIG. 6 schematically illustrates the display of the receiver 200 in a case where the number of views is set to five. Here, "View_0" indicates a center view, "View_1" indicates a first right view next to the center, "View_2" indicates a first left view next to the center, "View_3" indicates a second right view next to the center, that is, a right view, and "View_4" indicates a second left view next to the center, that is, a left view. In this case, only image data of the views of "View_0", "View_3", and "View_4" is transmitted from the broadcast station 100, the receiver 200 receives the image data of the views of "View_0", "View_3", and "View_4", and the image data of the views of remaining "View_1" and "View_2" is obtained through an interpolation process. Then, the receiver 200 synthesizes and displays images of the five views on the display in order to cause three-dimensional images (stereoscopic images) to be observed with the naked eye. Further, FIG. 6 illustrates a lenticular lens, but a parallax barrier may be used instead thereof.

(Configuration Example of Transmission Data Generation Unit)

Figure 7:
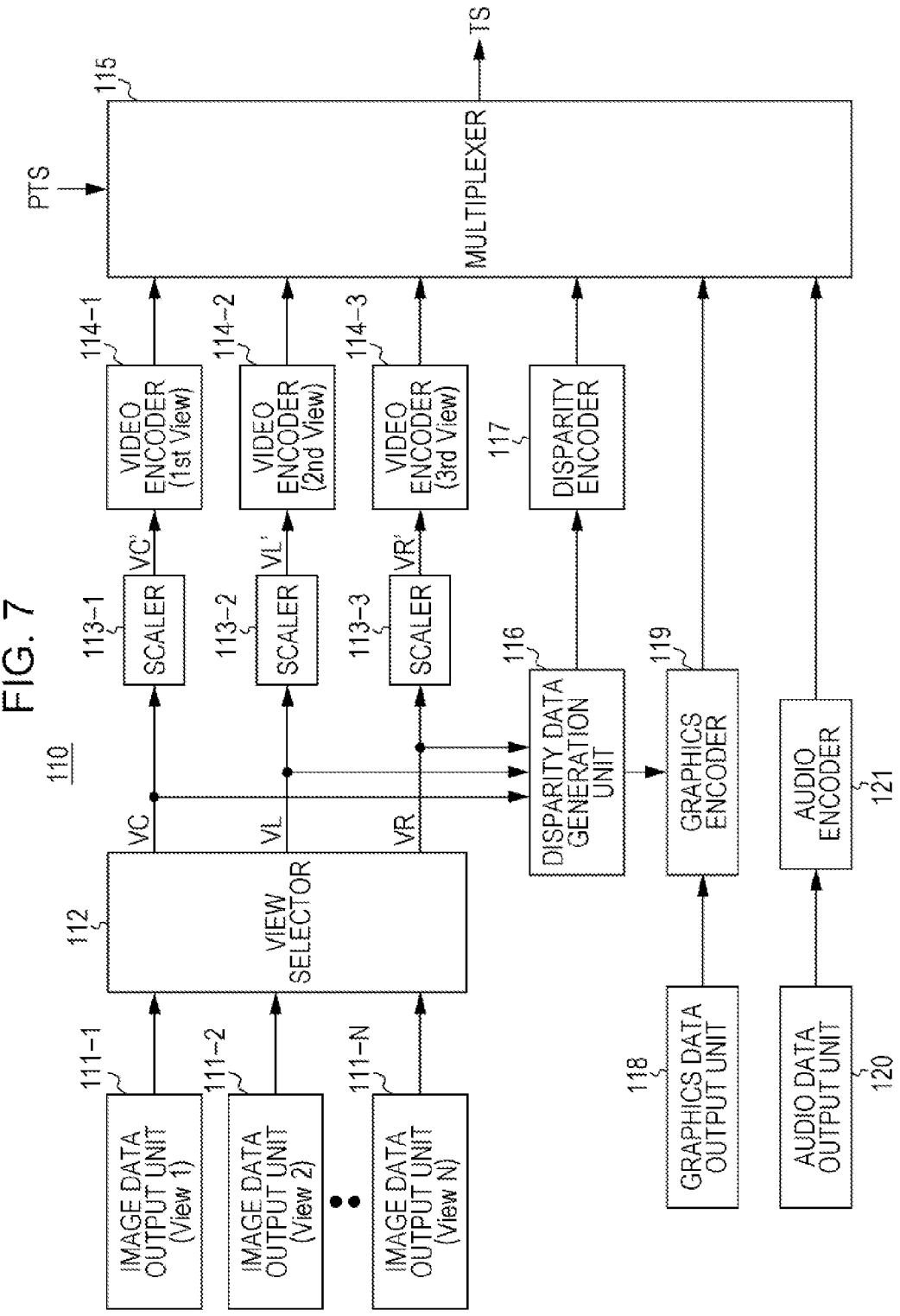
FIG. 7 is a block diagram illustrating a configuration example of a transmission data generation unit that generates a transport stream.

FIG. 7 illustrates a configuration example of a transmission data generation unit 110 which generates the aforementioned transport stream TS, in the broadcasting station 100. The transmission data generation unit 110 includes N image data output units 111-1 to 111-N, a view selector 112, scalers 113-1, 113-2 and 113-3, video encoders 114-1, 114-2 and 114-3, and a multiplexer 115. In addition, the transmission data generation unit 110 includes a disparity data generation unit 116, a disparity encoder 117, a graphics data output unit 118, a graphics encoder 119, a audio data output unit 120, and an audio encoder 121.

The image data output units 111-1 to 111-N output image data of N views (View 1, . . . , and View N) for stereoscopic image display. The image data output units are configured of, for example, a camera which captures an image of a subject and outputs image data, an image data reading unit which reads image data from a storage medium to be output, or the like. In addition, image data of a view which is not transmitted may not actually exist.

Figure 8:
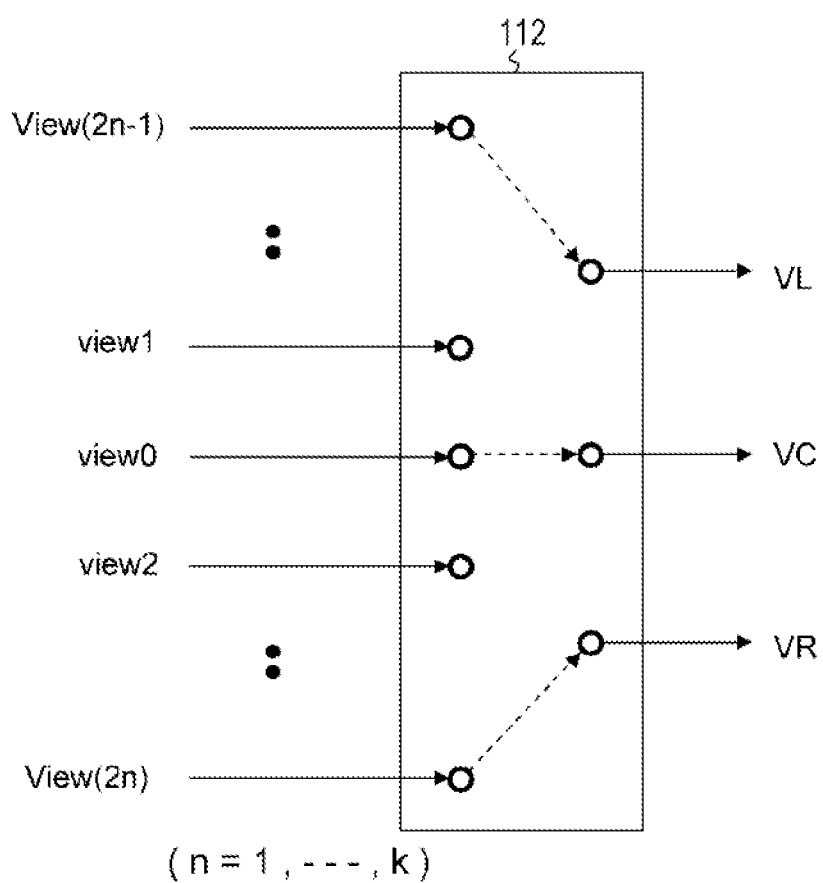
FIG. 8 is a diagram illustrating a view selecting state of a view selector in a transmission data generation unit.

Further, the view selector 112 selectively extracts image data of at least a left view and a right view and image data of an intermediate view (one or two or more) located between the left view and the right view, from image data of the N views (View 1, . . . , and View N). In this embodiment, the view selector 112 extracts image data VL of the left view and image data VR of the right view and extracts image data VC of the center view. FIG. 8 illustrates a view selection state in the view selector 112.

Further, the scalers 113-1, 113-2 and 113-3 respectively perform a scaling process on the image data VC, VL and VR and obtain, for example, image data VC', VL' and VR' of a full HD size of 1920*1080. In this case, when the image data VC, VL and VR has the full HD size of 1920*1080, the image data is output as it is. Further, when the image data VC, VL and VR has a larger size than the size of 1920*1080, the image data is scaled down and output.

The video encoder 114-1 performs coding such as, for example, MPEG4-AVC (MVC) or MPEG2video on the image data VC' of the center view and obtains coded video data. Then, the video encoder 114-1 generates a video stream including the coded data as a substream (substream 1) by using a stream formatter (not shown) which is provided in the subsequent stage.

Further, the video encoder 114-2 performs coding such as, for example, MPEG4-AVC (MVC) or MPEG2video on the image data VL' of the left view and obtains coded video data. Then, the video encoder 114-2 generates a video stream including the coded data as a substream (substream 2) by using a stream formatter (not shown) which is provided in the subsequent stage.

Furthermore, the video encoder 114-3 performs coding such as, for example, MPEG4-AVC (MVC) or MPEG2video on the image data VR' of the right view and obtains coded video data. Then, the video encoder 114-3 generates a video stream including the coded data as a substream (substream 3) by using a stream formatter (not shown) which is provided in the subsequent stage.

The video encoders 114-1, 114-2 and 114-3 insert the aforementioned view configuration information into the layer of the video stream. As described above, the view configuration information includes information indicating a view of which the image data is included in the video stream, and information indicating whether or not data of a plurality of pictures is coded in one access unit of the video stream. The view configuration information is inserted into, for example, a user data area of a picture header or a sequence header of the video stream, or the like.

Figure 9:
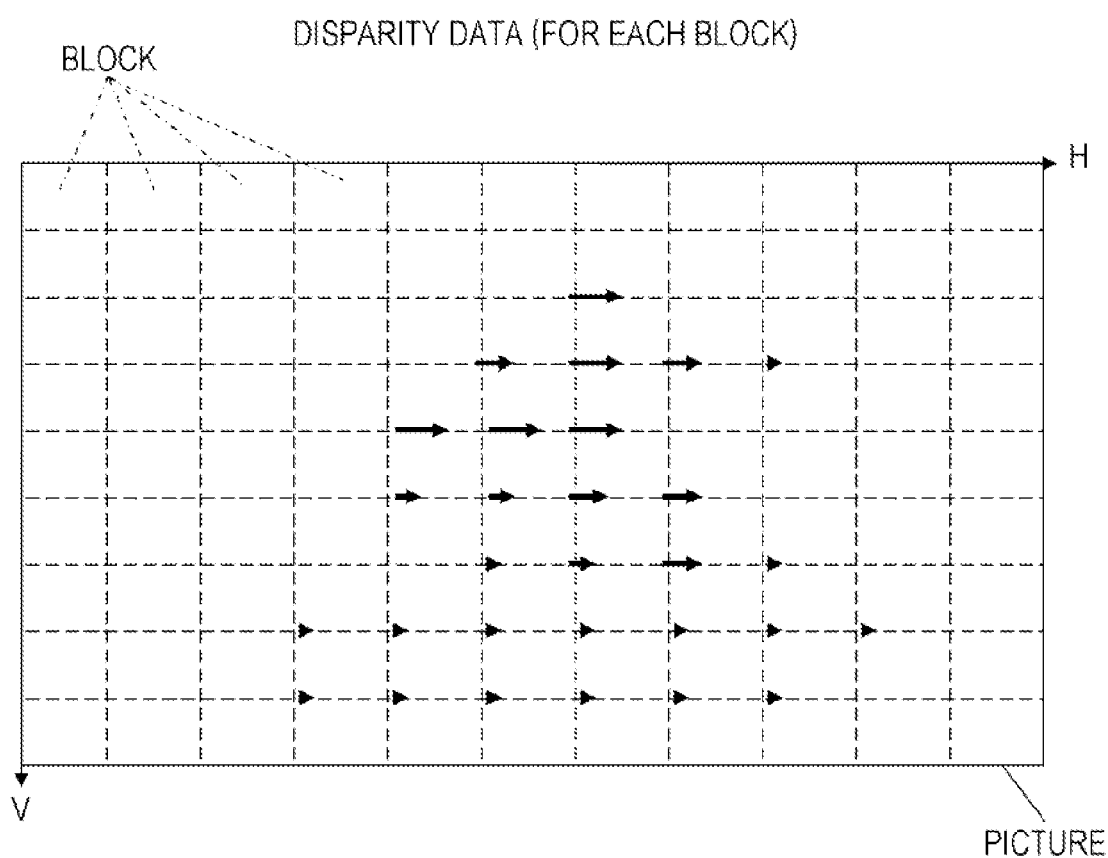
FIG. 9 is a diagram illustrating an example of disparity data (disparity vector) for each block.

The disparity data generation unit 116 generates disparity data based on the image data of each of the center, left and right views output from the view selector 112. The disparity data includes, for example, disparity data between the center view and the left view and disparity data between the center view and the right view. In this case, the disparity data is generated in a unit of a pixel or a unit of block. FIG. 9 illustrates an example of disparity data (disparity vector) for each block.

Figure 10:
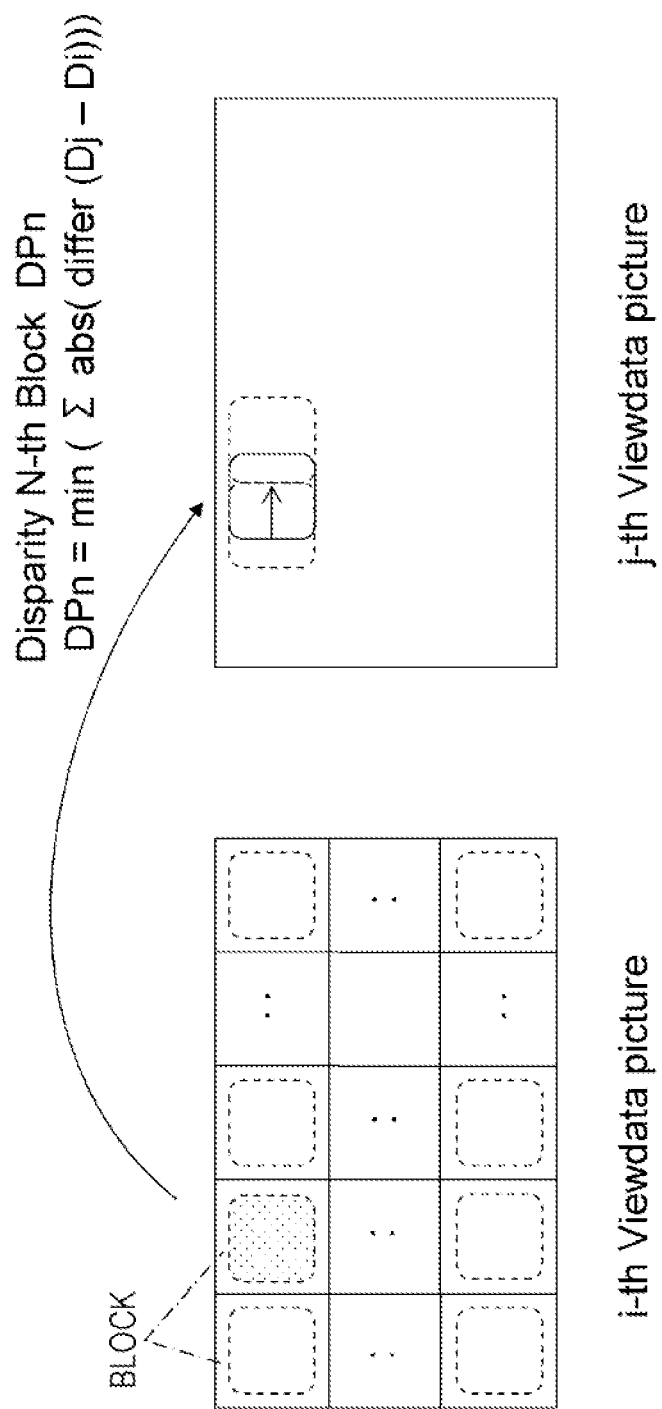
FIG. 10 is a diagram illustrating an example of a generation method of disparity data in a unit of a block.

FIG. 10 illustrates an example of a method of generating disparity data in a unit of a block. The example is an example in which disparity data indicating a j-th view is obtained from an i-th view. In this case, pixel blocks (disparity detection blocks) such as, for example, 4*4, 8*8, or 16*16 are set in a picture of the i-th view.

As illustrated in the figure, the picture of the i-th view is assumed to be a detection image, the picture of the j-th view is assumed to a reference image, and disparity data is obtained by blocks of the picture of the j-th view being searched such that a sum of absolute differences between pixels becomes the minimum for each block of the picture of the i-th view.

That is, disparity data DPn of an N-th block is obtained by blocks being searched such that the sum of absolute differences in the N-th block becomes the minimum for example, as shown in the following Equation (1). In addition, in Equation (1), Dj indicates a pixel value in the picture of the j-th view and Di indicates a pixel value in the picture of the i-th view.

$$DPn = \min(\Sigma abs(differ(Dj-Di))) \quad (1)$$

Figure 11:
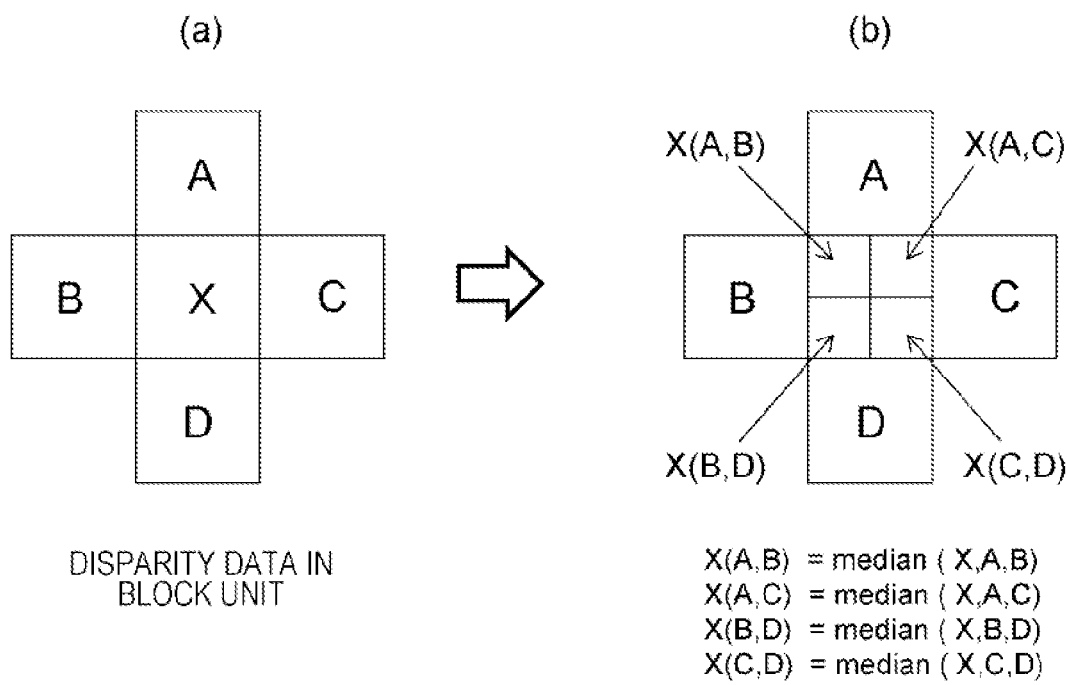
FIG. 11 is a diagram illustrating a generation method of disparity data in a unit of a pixel through a processing of converting from a unit of block to a unit of pixel.

FIG. 11 illustrates an example of a method of generating disparity data in a unit of a pixel. This example adopts a method of generating disparity data in a unit of a pixel by converting disparity data in a unit of a block to disparity data in a unit of a pixel. "A", "B", "C", "D", and "X" in FIG. 11(a) respectively indicate block areas.

From disparity data of the blocks, as shown in FIG. 11(b), disparity data of each of four areas into which the block "X" is divided is obtained by the following Equation (2). For example, disparity data X(A, B) of the divided area adjacent to "A" and "B" is a median of disparity data of the blocks "A", "B" and "X." This is also the same for the other divided areas and thus disparity data is obtained.

$$X(A,B) = \text{median}(X,A,B)$$

$$X(A,C) = \text{median}(X,A,C)$$

$$X(B,D) = \text{median}(X,B,D)$$

$$X(C,D) = \text{median}(X,C,D) \quad (2)$$

Through the aforementioned one conversion, the size of an area occupied by the disparity data is reduced to ½ of the original vertical and horizontal size. The conversion is repeated a predetermined number of times according to the block size, whereby disparity data in a unit of a pixel is obtained. In addition, in a case where complexity of an object in a screen is higher than other portions because an edge is included in a texture, or the like, it is possible to improve texture-following capability of initial disparity data itself in a unit of a block by setting a block size to be appropriately small.

The disparity encoder 117 performs coding on the disparity data generated by the disparity data generation unit 116 to generate a disparity stream (disparity data elementary stream). This disparity stream includes disparity data in a unit of a pixel or a unit of block. In a case where the disparity data is data in a unit of a pixel, the disparity data may be compression-coded and be transmitted in the same manner as pixel data.

In addition, in a case where disparity data in a unit of a block is included in this disparity stream, the reception side performs the aforementioned conversion process to convert the disparity data in the unit of block into the disparity data in a unit of a pixel. Further, in a case where this disparity stream is not transmitted, as described above, the reception side may obtain the disparity data in the unit of block between the respective views and further convert the disparity data in the unit of block into the disparity data in unit of pixel.

The graphics data output unit 118 outputs data of graphics (also including subtitles as captions) superimposed on an image. The graphics encoder 119 generates a graphics stream (graphics elementary stream) including the graphics data output from the graphics data output unit 118. Here, the graphics configure superimposition information, and for example, the graphics are a logo, a caption, and the like.

In addition, the graphics data output from the graphics data output unit 118 is, for example, data of graphics superimposed on an image of the center view. The graphics encoder 119 may create data of graphics superimposed on the left and right views based on the disparity data generated in the disparity data generation unit 116, and may generate a graphics stream including the graphics data. In this case, it is not necessary for the reception side to create data of graphics superimposed on the left and right views.

The graphics data is mainly bitmap data. Offset information indicating a superimposed position on an image is added to the graphics data. The offset information indicates, for example, an offset value in a vertical direction and a horizontal direction from the origin at the upper left of an image to a pixel at the upper left of a superimposed position of the graphics. In addition, a standard in which caption data is transmitted as bitmap data is standardized and operated as for example, "DVB_Subtitling" in DVB which is a European digital broadcast standard.

The audio data output unit 120 outputs audio data corresponding to image data. The audio data output unit 120 is configured of, for example, an audio data reading unit which reads audio data from a microphone or a storage medium to be output. The audio encoder 121 performs coding such as MPEG-2Audio or AAC on the audio data output from the audio data output unit 120 to generate an audio stream (audio elementary stream).

The multiplexer 115 packetizes and multiplexes the respective elementary streams generated in the video encoders 114-1, 114-2 and 114-3, the disparity encoder 117, the graphics encoder 119, and the audio encoder 121 to generate a transport stream TS. In this case, a Presentation Time Stamp (PTS) is inserted into a header of each Packetized Elementary Stream (PES) such that the reception side performs synchronous reproduction.

The multiplexer 115 inserts the aforementioned identification information into the layer of the transport stream TS. This identification information is information identifying whether or not view configuration information is inserted into the layer of the video stream. This identification information is inserted, for example, under a video elementary loop (Video ESloop) of a Program Map Table (PMT) included in the transport stream TS, an Event Information Table (EIT), or the like.

The operation of the transmission data generation unit 110 shown in FIG. 7 will be simply described. Image data of N views (View 1, . . . , and View N) for stereoscopic image display, output from the N image data output units 111-1 to 111-N, is supplied to the view selector 112. The view selector 112 extracts image data VC of the center view, image data VL of the left view, and image data VR of the right view from the image data of the N views.

The image data VC of the center view extracted from the view selector 112 is supplied to the scaler 113-1 and subjected to, for example, a scaling process to a full HD size of 1920*1080. Image data VC' subjected to the scaling process is supplied to the video encoder 114-1.

The video encoder 114-1 performs a coding on the image data VC' and obtains coded video data, and generates a video stream including the coded data as a substream (substream 1). In addition, the video encoder 114-1 inserts the view configuration information including information indicating a view of which the image data is included in the video stream, and the like into a user data area of a picture header or a sequence header of the video stream. The video stream is supplied to the multiplexer 115.

Further, the image data VL of the left view extracted from the view selector 112 is supplied to the scaler 113-2 and subjected to, for example, a scaling process to a full HD size of 1920*1080. Image data VL' subjected to the scaling process is supplied to the video encoder 114-2.

The video encoder 114-2 performs a coding on the image data VL' and obtains coded video data, and generates a video stream including the coded data as a substream (substream 2). Further, the video encoder 114-2 inserts the view configuration information including information indicating a view of which the image data is included in the video stream, and the like into the user data area of the picture header or the sequence header of the video stream. The video stream is supplied to the multiplexer 115.

Furthermore, the image data VR of the right view extracted from the view selector 112 is supplied to the scaler 113-3 and subjected to, for example, a scaling process to a full HD size of 1920*1080. Image data VR' subjected to the scaling process is supplied to the video encoder 114-3.

The video encoder 114-3 performs a coding on the image data VR' and obtains coded video data, and generates a video stream including the coded data as a substream (substream 3). Further, the video encoder 114-3 inserts the view configuration information including information indicating of which view the image data is the image data included in the video stream, and the like into the user data area of the picture header or the sequence header of the video stream. The video stream is supplied to the multiplexer 115.

Further, the image data of each of the center, left and right views output from the view selector 112 is supplied to the disparity data generation unit 116. The disparity data generation unit 116 generates disparity data based on the image data of each view. The disparity data includes disparity data between the center view and the left view and disparity data between the center view and the right view. In this case, disparity data is generated in a unit of a pixel or in a unit of block.

The disparity data generated in the disparity data generation unit 116 is supplied to the disparity encoder 117. The disparity encoder 117 performs a coding process on the disparity data to generate a disparity stream. The disparity stream is supplied to the multiplexer 115.

Further, graphics data (also including subtitle data) output from the graphics data output unit 118 is supplied to the graphics encoder 119. The graphics encoder 119 generates a graphics stream including the graphics data. The graphics stream is supplied to the multiplexer 115.

Furthermore, audio data output from the audio data output unit 120 is supplied to the audio encoder 121. The audio encoder 121 performs a coding such as MPEG-2Audio or AAC on the audio data to generate an audio stream. This audio stream is supplied to the multiplexer 115.

The multiplexer 115 packetizes and multiplexes the elementary streams supplied from each encoder to generate a transport stream TS. In this case, a PTS is inserted into each PES header for synchronous reproduction on the reception side. Further, the multiplexer 115 inserts identification information identifying whether or not view configuration information is inserted into the layer of the video stream, under the PMT, the EIT, or the like.

In addition, the transmission data generation unit 110 shown in FIG. 7 is in a case where three video streams are included in the transport stream TS. In other words, the transport stream TS includes three video streams obtained by coding each of image data of the center, left and right views as a single picture.

Although the detailed description will be omitted, it is possible to have the same configuration as described above, even in a case where two or one video stream is included in the transport stream TS. In a case where two video streams are included in the transport stream TS, for example, the following video streams are included. That is, a video stream obtained by coding image data of the center view as a single picture and a video stream obtained by performing an interleaving process on image data items of the left view and the right view to be coded as a single picture are included.

Further, in a case where one video stream is included in the transport stream TS, for example, the following video streams are included. That is, a video stream including data obtained by coding each of image data of the center, left and right views as data of a single picture is included.

[Structure of Identification Information and View Configuration Information, and TS Configuration]

As described above, identification information for identifying whether or not the view configuration information is inserted into the layer of the video stream, is inserted into the layer of the transport stream TS. FIG. 12 illustrates a structural example (Syntax) of a multiview stream configuration descriptor (multiview_stream_configuration_descriptor) as identification information. Further, FIG. 13 illustrates content (Semantics) of main information in the structural example shown in FIG. 12.

"multiview_stream_configuration_tag" is 8-bit data indicating a descriptor type, and, here, indicates a multiview stream configuration descriptor. "multiview_stream_configuration_length" is 8-bit data indicating a length (size) of a descriptor. This data indicates the number of subsequent bytes as a length of the descriptor.

The 1-bit field of "multiview_stream_checkflag" indicates whether or not view configuration information is inserted into the layer of the video stream. "1" indicates that view configuration information is inserted into the layer of the video stream, and "0" indicates that there is no insertion. If the multiview_stream_checkflag is "1", a reception side (decoder) checks view configuration information which is present in a user data area.

In addition, as described above, view configuration information including information indicating a view of which the image data is included in the video stream is inserted into the layer of the video stream. FIG. 14 illustrates a structural example (Syntax) of multi-view stream configuration information (multiview_stream_configuration_info( )) as the view configuration information. In addition, FIGS. 15, 16 and 17 illustrate content (Semantics) of main information in the structural example shown in FIG. 14.

The 1-bit field of "3D_flag" indicates whether or not image data included in a coded video stream is image data of a portion of views forming 3D. "1" indicates that image data is image data of a portion of views, and "0" indicates that image data is not image data of a portion of views.

If "3D_flag=1", each piece of information of "view_count", "single_view_es_flag", and "view_interleaving_flag" is present. The 4-bit field of "view_count" indicates the number of views forming a 3D service. The minimum value thereof is 1, and the maximum value thereof is 15. The 1-bit field of "single_view_es_flag" indicates whether or not data of a plurality of pictures is coded in one access unit of the video stream. "1" indicates that data of only a single picture is coded, and "0" indicates that data of two or more pictures is coded.

The 1-bit field of "view_interleaving_flag" indicates whether or not image data of two views is subjected to an interleaving process and is coded as data of a single picture in the video stream. "1" indicates that image data is subjected to an interleaving process and forms a screen split, and "0" indicates that an interleaving process is not performed.

If "view_interleaving_flag=0", information of "view_allocation" is present. The 4-bit field of "view_allocation" indicates a view of which the image data is included in the video stream, that is, view allocation. For example, "0000" indicates a center view. In addition, for example, "0001" indicates a first left view next to the center. Further, for example, "0010" indicates a first right view next to the center.

If "view_interleaving_flag=1", information of "view_pair_position_id" and "view_interleaving_type" is present. The 3-bit field of "view_pair_position_id" indicates a relative view position between two views in all the views. In this case, for example, an earlier position in scanning order is set to left, and a later position is set to right. For example, "000" indicates a pair of two views located at both ends. In addition, for example, "001" indicates a pair of two views located inward by one from both ends. Further, for example, "010" indicates a pair of two views located inward by one from both ends.

The 1-bit field of "view_interleaving_type" indicates an interleaving type. "1" indicates that an interleaving type is side-by-side, and "0" indicates that an interleaving type is top-and-bottom.

Further, if "3D_flag=1", each piece of information of "display_flag", "indication_of_picture_size_scaling_horizontal", and "indication_of_picture_size_scaling_vertical" is present. The 1-bit field of "display_flag" indicates whether or not the view is required for display when image display is performed. "1" indicates that the view is required for display. On the other hand, "0" indicates that the view is not required for display.

The 4-bit field of "indication_of_picture_size_scaling_horizontal" indicates a horizontal pixel ratio of a decoded image to full HD (1920). "0000" indicates 100%, "0001" indicates 80%, "0010" indicates 75%, "0011" indicates 66%, "0100" indicates 50%, "0101" indicates 33%, "0110" indicates 25%, and "0111" indicates 20%.

The 4-bit field of "indication_of_picture_size_scaling_vertical" indicates a vertical pixel ratio of a decoded image to full HD (1080). "0000" indicates 100%, "0001" indicates 80%, "0010" indicates 75%, "0011" indicates 66%, "0100" indicates 50%, "0101" indicates 33%, "0110" indicates 25%, and "0111" indicates 20%.

FIG. 18 illustrates an example of a relationship between the number of views indicated by "view_count" and positions of two views (here, "View_1" and "View_2") indicated by "view_pair_position_id". An example of (1) is a case where the number of views indicated by "view_count" is 2, and "view_pair_position_id=000" indicates two views located at both ends. In addition, an example of (2) is a case where the number of views indicated by "view_count" is 4, and "view_pair_position_id=000" indicates two views located at both ends.

Further, an example of (3) is a case where the number of views indicated by "view_count" is 4, and "view_pair_position_id=001" indicates two views located inward by one from both ends. Furthermore, an example of (4) is a case where the number of views indicated by "view_count" is 5, and "view_pair_position_id=000" indicates two views located at both ends.

In addition, an example of (5) is a case where the number of views indicated by "view_count" is 9, and "view_pair_position_id=000" indicates two views located at both ends. Further, an example of (6) is a case where the number of views indicated by "view_count" is 9, and "view_pair_position_id=010" indicates two views located inward by two from both ends.

A pair of views located further inward than both ends may be transmitted additionally to a pair of views at both ends in order to improve a performance of interpolation synthesis in a case where sufficient image quality is not achieved by using two views at both ends when a reception side synthesizes views. At this time, the coded video data of the pair of views to be additionally transmitted may be coded to share an access unit in a stream of the pair of views at both ends, or may be coded as another stream.

FIG. 19 illustrates a generation example of disparity data on a transmission side or a reception side, in a case where image data of a pair of two views located further inward than both ends is transmitted along with image data of two views located at both ends as described above. In the shown example, the number of views indicated by "view_count" is set to 9. In addition, it is assumed that a substream (substream 1) including image data of two views (View 1 and View 2) at both ends and a substream (substream 2) including image data of two views (View 3 and View 4) located further inward than the two views are present.

In this case, first, disparity data of "View 1" and "View 3" is calculated. Next, disparity data of "View 2" and "View 4" is calculated. Finally, disparity data of "View 3" and "View 4" is calculated. In addition, in a case where resolutions of views are different between substreams, a resolution is adjusted to either one, and then disparity data is calculated.

Figure 20:
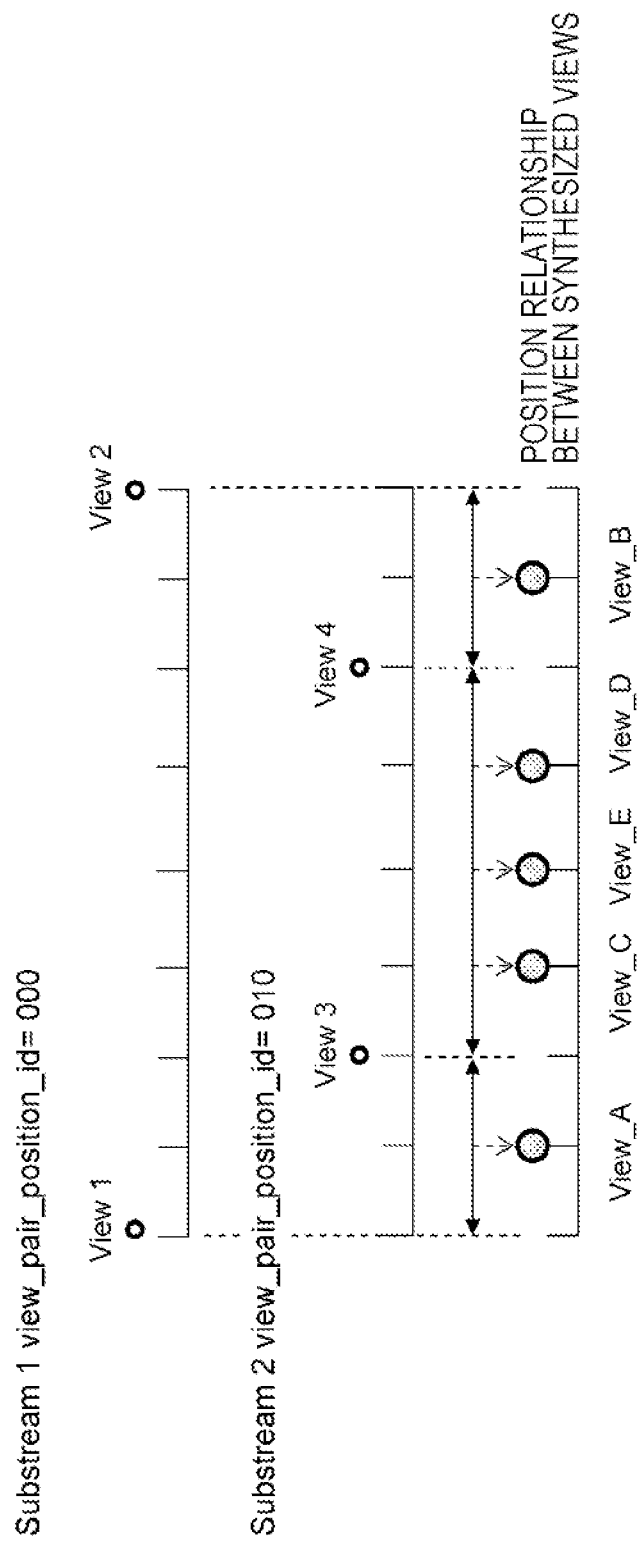
FIG. 20 is a diagram illustrating an example in which the reception side interpolates and synthesizes image data of views located between respective views based on disparity data.

FIG. 20 illustrates an example in which the reception side interpolates and synthesizes image data of a view located between the respective views based on the disparity data calculated as described above. In this case, "View A" located between "View 1" and "View 3" is interpolated and synthesized using the disparity data between "View 1" and "View 3".

Next, "View_B" located between "View 2" and "View 4" is interpolated and synthesized using the disparity data between "View 2" and "View_4". Finally, "View_C", "View_D", and "View_E" located between "View 3" and "View 4" are interpolated and synthesized using the disparity data between "View 3" and "View 4".

Next, a description will be given regarding a case where the multi-view stream configuration information (multiview_stream_configuration_info( )) as the view configuration information is inserted into a user data area of the video stream (video elementary stream). In this case, the multi-view stream configuration information is inserted, for example, in a unit of a picture or a unit of a GOP by using the user data area.

Figure 21:
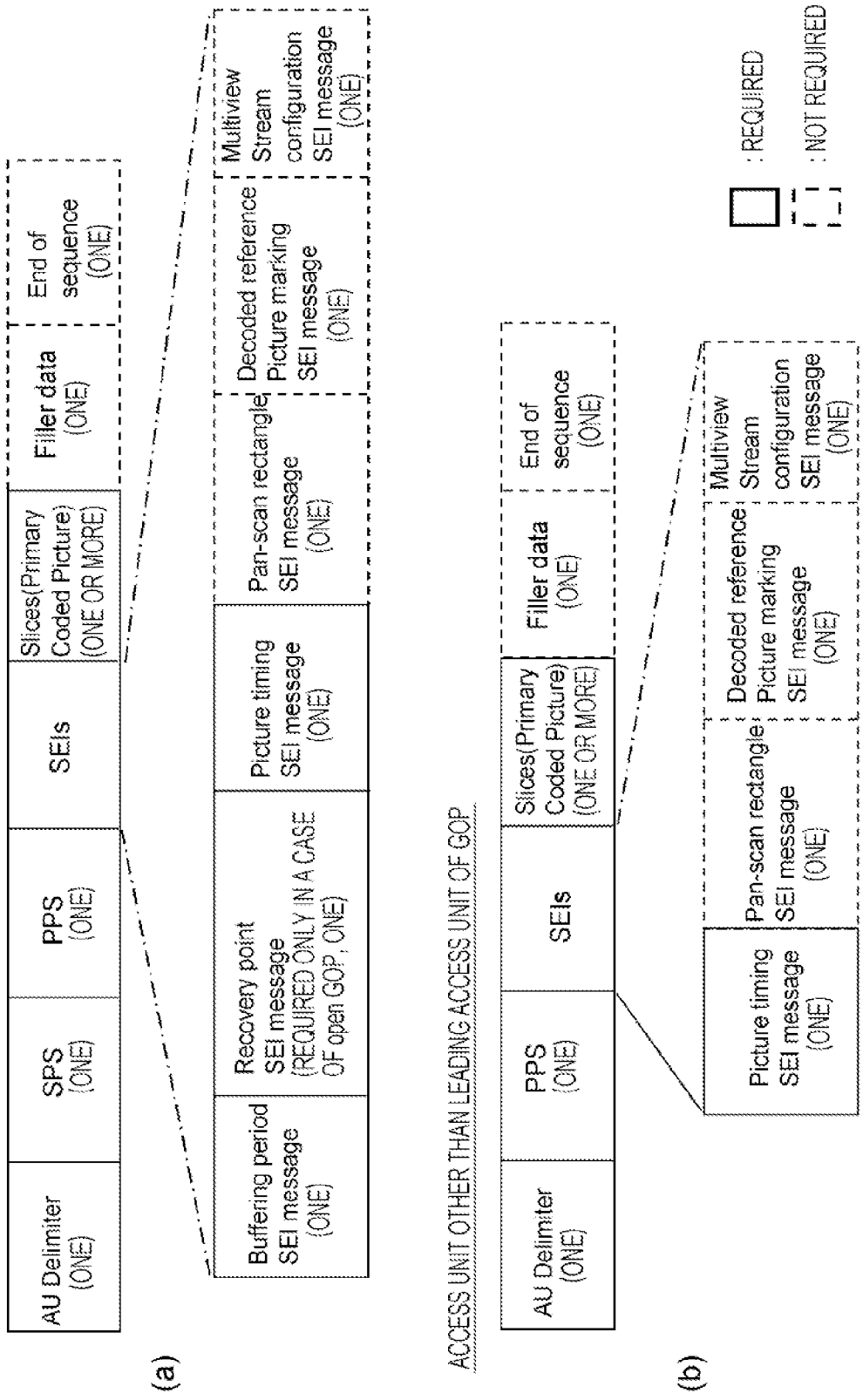
FIG. 21 is a diagram illustrating that the multiview stream configuration information is inserted into a "SELs" portion of an access unit as "Multiview stream configuration SEI message."

For example, in a case where a coding type is AVC, the multi-view stream configuration information is inserted into the "SELs" part of the access unit, as "Multi-view stream configuration SEI message". FIG. 21(a) illustrates a leading access unit of Group of Pictures (GOP), and FIG. 21(b) illustrates access units other than the leading access unit of the GOP. In a case where the multi-view stream configuration information is inserted in a unit of a GOP, "Multi-view stream configuration SEI message" is inserted only into the leading access unit of the GOP.

FIG. 22(a) illustrates a structural example (Syntax) of "Multi-view stream configuration SEI message". "uuid_iso_iec_11578" has a UUID value indicated by "ISO/IEC 11578: 1996 Annex A." "userdata_for_multiview_stream_configuration( )" is inserted into the field of "user_data_payload_byte". FIG. 22(b) illustrates a structural example (Syntax) of "userdata_for_multiview_stream_configuration( )". The multiview stream configuration information (multiview_stream_configuration_info( )) is inserted thereinto (refer to FIG. 14). "userdata_id" is an identifier of the multi-view stream configuration information, represented by unsigned 16 bits.

Further, for example, in a case where a coding type is MPEG2video, the multi-view stream configuration information is inserted into a user data area of a picture header part as user data "user_data( )". FIG. 23(a) illustrates a structural example (Syntax) of "user_data( )". The 32-bit field of "user_data_start_code" is a start code of user data (user_data) and has a fixed value of "0x000001B2".

The 32-bit field subsequent to the start code is an identifier for identifying content of user data. Here, the identifier is "Stereo_Video_Format_Signaling_identifier" and enables user data to be identified as multi-view stream configuration information. "Multiview_stream_configuration( )" which is stream correlation information is inserted subsequent to the identifier as a data body. FIG. 23(b) illustrates a structural example (Syntax) of "Multiview_stream_configuration( )". The multi-view stream configuration information (multiview_stream_configuration_info( )) is inserted thereinto (refer to FIG. 14).

The multi-view stream configuration descriptor (multiview_stream_configuration_descriptor) as identification information illustrated in FIG. 12 described above is inserted into the layer of the transport stream TS, for example, under the PMT, under the EIT, or the like. That is, the descriptor is disposed at an optimal position in a unit of an event or in a case of temporally static or dynamic use.

Figure 24:
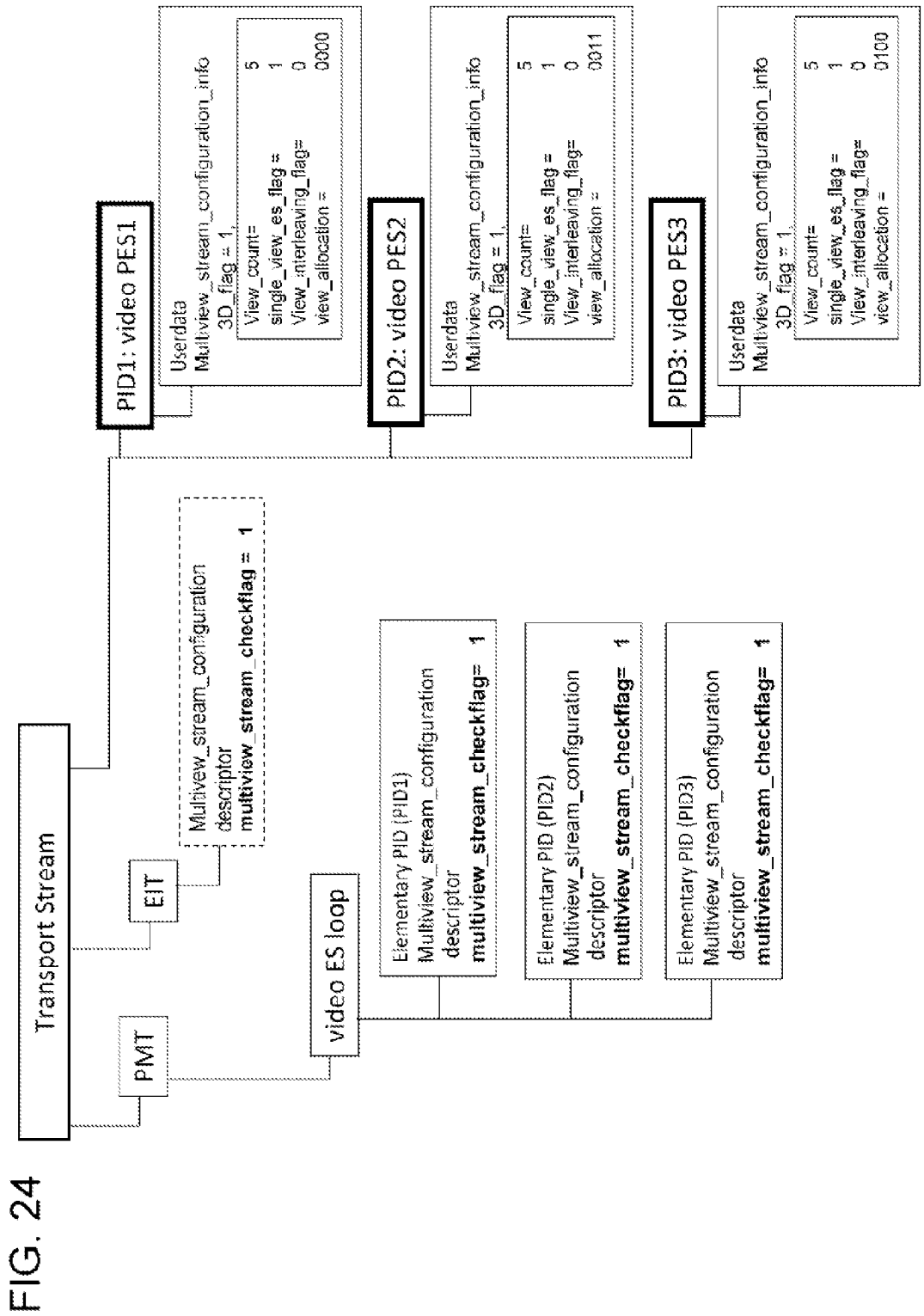
FIG. 24 is a diagram illustrating a configuration example of a case where three video streams are included in a transport stream TS.

FIG. 24 illustrates a configuration example of the transport stream TS. In addition, in this configuration example, for simplification of the figure, disparity data, audio, graphics, and the like are not shown. This configuration example illustrates a case where three video streams are included in the transport stream TS. That is, the transport stream TS includes three video streams which are obtained by coding each of image data of center, left and right views as a single picture. In addition, this configuration example illustrates a case where the number of views is 5.

The configuration example of FIG. 24 includes a PES packet "video PES1" of a video stream in which the image data VC' of the center view is coded as a single picture. The multi-view stream configuration information inserted into the user data area of the video stream indicates that the number of views indicated by "View_count" is 5.

In addition, in this information, there is "single_view_es_flag=1" which indicates that data of only a single picture is coded in one access unit in the video stream. Further, in this information, there is "View_interleaving_flag=0" which indicates that image data of two views is not subjected to an interleaving process and is not coded as data of a single picture. In addition, there is "view_allocation=0000" which indicates that the image data included in the video stream is image data of the center view.

The configuration example of FIG. 24 includes a PES packet "video PES2" of a video stream in which the image data VL' of the left view is coded as a single picture. The multi-view stream configuration information inserted into the user data area of the video stream indicates that the number of views indicated by "View_count" is 5.

In addition, in this information, there is "single_view_es_flag=1" which indicates that data of only a single picture is coded in one access unit in the video stream. Further, in this information, there is "View_interleaving_flag=0" which indicates that image data of two views is not subjected to an interleaving process and is not coded as data of a single picture. In addition, there is "view_allocation=0011" which indicates that the image data included in the video stream is image data of a second left view next to the center, that is, the left view.

The configuration example of FIG. 24 includes a PES packet "video PES3" of a video stream in which the image data VR' of the left view is coded as a single picture. The multi-view stream configuration information inserted into the user data area of the video stream indicates that the number of views indicated by "View_count" is 5.

Further, in this information, there is "single_view_es_flag=1" which indicates that data of only a single picture is coded in one access unit in the video stream. Further, in this information, there is "View_interleaving_flag=0" which indicates that image data of two views is not subjected to an interleaving process and is not coded as data of a single picture. Furthermore, there is "view_allocation=0100" which indicates that the image data included in the video stream is image data of a second right view next to the center, that is, the right view.

Further, the transport stream TS includes a Program Map Table (PMT) as Program Specific Information (PSI). The PSI is information describing to which program each elementary stream included in the transport stream belongs. Furthermore, the transport stream includes an Event Information Table (EIT) as Serviced Information (SI) for performing management in a unit of an event.

An elementary loop having information related to each elementary stream is present in the PMT. In this configuration example, a video elementary loop (Video ESloop) is present. In the elementary loop, for each stream, information such as a packet identifier (PID) is disposed, and a descriptor describing information related to the elementary stream is also disposed.

In this configuration example, a multi-view stream configuration descriptor (multiview_stream_configuration_descriptor) is inserted under the video elementary loop (Video ESloop) of the PMT, in relation to each video stream. In this descriptor, "multiview_stream_checkflag=1" indicates that the multi-view stream configuration information as view configuration information is present in the user area of the video stream. In addition, it is considered that the descriptor is inserted under the EIT as shown by the broken line.

Figure 25:
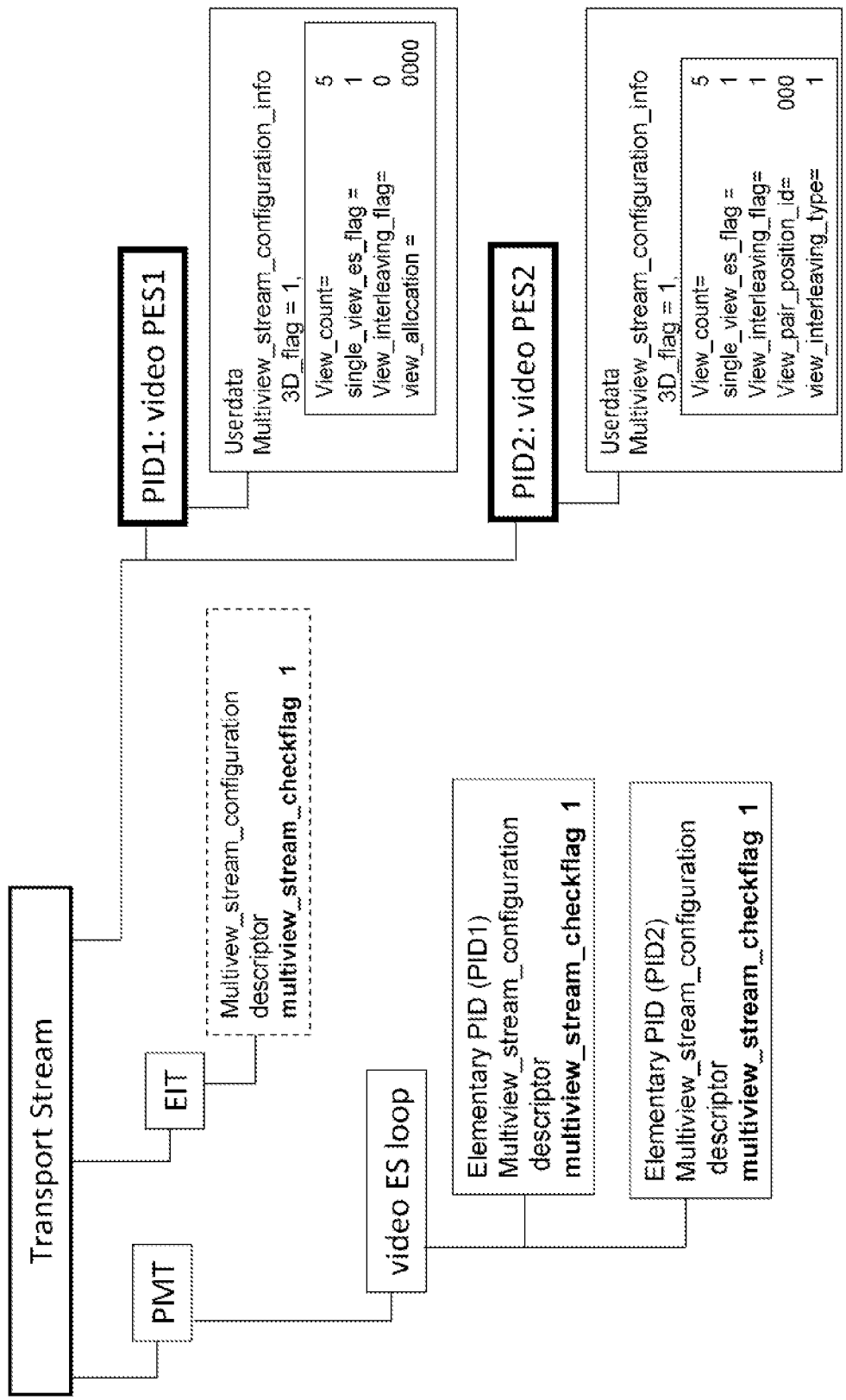
FIG. 25 is a diagram illustrating a configuration example of a case where two video streams are included in the transport stream TS.

Further, FIG. 25 also illustrates a configuration example of the transport stream TS. In addition, even in this configuration example, for simplification of the figure, disparity data, audio, graphics, and the like are not shown. This configuration example shows a case where two video streams are included in the transport stream TS. That is, the transport stream TS includes a video stream obtained by coding image data of the center view as a single picture. In addition, the transport stream TS includes a video stream which is obtained by interleaving image data of the left view and the right view to be coded as a single picture. In addition, this configuration example also shows a case where the number of views is 5.

The configuration example of FIG. 25 includes a PES packet "video PES1" of a video stream in which the image data VC' of the center view is coded as a single picture. The multi-view stream configuration information inserted into the user data area of the video stream indicates that the number of views indicated by "View_count" is 5.

In addition, in this information, there is "single_view_es_flag=1" which indicates that data of only a single picture is coded in one access unit in the video stream. Further, in this information, there is "View_interleaving_flag=0" which indicates that image data of two views is not subjected to an interleaving process and is not coded as data of a single picture. In addition, there is "view_allocation=0000" which indicates that the image data included in the video stream is image data of the center view.

The configuration example of FIG. 25 includes a PES packet "video PES2" of a video stream in which the image data VL' of the left view and the image data VR' of the right view is coded as a single picture. The multi-view stream configuration information inserted into the user data area of the video stream indicates that the number of views indicated by "View_count" is 5.

In addition, in this information, there is "single_view_es_flag=1" which indicates that data of only a single picture is coded in one access unit in the video stream. Further, in this information, there is "View_interleaving_flag=1" which indicates that image data of two views is subjected to an interleaving process and is coded as data of a single picture. In addition, there is "view_pair_position_id=000" which indicates a pair of two views at both ends. Further, there is "view_interleaving_type=1" which indicates that an interleaving type is a side-by-side type.

In this configuration example, a multi-view stream configuration descriptor (multiview_stream_configuration_descriptor) is inserted under the video elementary loop (Video ESloop) of the PMT, in relation to each video stream. In this descriptor, there is "multiview_stream_checkflag=1" which indicates that the multi-view stream configuration information as view configuration information is present in the user area of the video stream. In addition, the descriptor may be inserted under the EIT as shown by the broken line.

Figure 26:
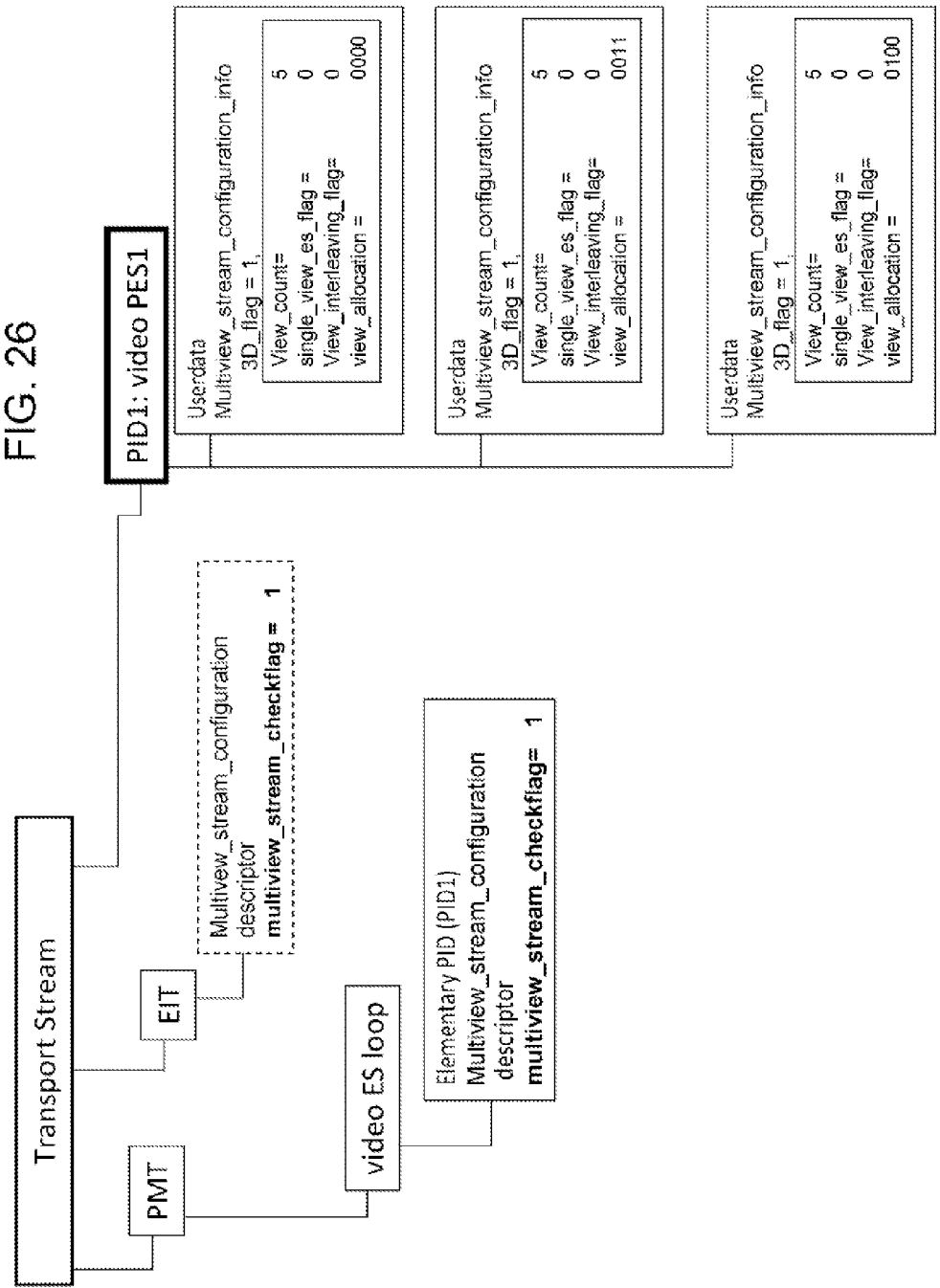
FIG. 26 is a diagram illustrating a configuration example of a case where one video stream is included in the transport stream TS.

In addition, FIG. 26 also illustrates a configuration example of the transport stream TS. Further, also in this configuration example, for simplification of the figure, disparity data, audio, graphics, and the like are not shown. This configuration example shows a case where one video stream is included in the transport stream TS. In other words, the transport stream TS includes a video stream obtained by coding image data of each of the center, left and right views as data of a single picture. In addition, this configuration example also shows a case where the number of views is 5.

The configuration example of FIG. 26 includes a PES packet "video PES1" of one video stream. The video stream includes data in which image data of each of the center, left and right views is coded as data of a single picture in one access unit, and a user data area corresponding to each picture is present. Then, multi-view stream configuration information is inserted into each user data area.

The information corresponding to the picture data obtained by coding image data of the center view indicates that the number of views indicated by "View_count" is 5. In addition, in this information, there is "single_view_es_flag=0" which indicates that data of a plurality of pictures is coded in one access unit in the video stream. Further, in this information, there is "View_interleaving_flag=0" which indicates that image data of two views is not subjected to an interleaving process and is not coded. In addition, there is "view_allocation=0000" which indicates that the image data included in the picture data is image data of the center view.

Further, the information corresponding to the picture data obtained by coding image data of the left view indicates that the number of views indicated by "View_count" is 5. In addition, in this information, there is "single_view_es_flag=0" which indicates that data of a plurality of pictures is coded in one access unit in the video stream. Further, in this information, there is "View_interleaving_flag=0" which indicates that image data of two views is not subjected to an interleaving process and is not coded. In addition, there is "view_allocation=0011" which indicates that the image data included in picture data is image data of a second left view next to the center, that is, the left view.

In addition, the information corresponding to the picture data obtained by coding image data of the right view indicates that the number of views indicated by "View_count" is 5. In addition, in this information, there is "single_view_es_flag=0" which indicates that data of a plurality of pictures is coded in one access unit in the video stream. Further, in this information, there is "View_interleaving_flag=0" which indicates that image data of two views is not subjected to an interleaving process and is not coded. Further, there is "view_allocation=0100" which indicates that the image data included in the picture data is image data of a second right view next to the center, that is, the right view.

In this configuration example, a multi-view stream configuration descriptor (multiview_stream_configuration_descriptor) is inserted under the video elementary loop (Video ESloop) of the PMT, in relation to each video stream. In this descriptor, there is "multiview_stream_checkflag=1", which indicates the presence of the multi-view stream configuration information as view configuration information in the user area of the video stream. In addition, it is also considered that the descriptor is inserted under the EIT as shown by the broken line.

As described above, the transmission data generation unit 110 shown in FIG. 7 generates a transport stream TS including a video stream which is obtained by coding image data of at least a left view and a right view and image data of an intermediate view located between the left view and the right view among a plurality of views for stereoscopic image display. For this reason, it is possible to effectively transmit image data for causing a stereoscopic image by multi-view configuration to be observed with the naked eye.

That is, since not only the image data of the left view and the right view, but also the image data of the center view is transmitted, a relative disparity between views is small, an interpolation becomes easy around an occlusion accompanied by a processing of a small part when image data of other views is interpolated, and thereby it is possible to improve the quality of a reproduced image. In addition, since image data of the left view and the right view is transmitted, image data of a view which is not transmitted may be synthesized through an entire interpolation process, and thus it is possible to easily maintain high image quality with regard to processing of an end point such as an occlusion.

In addition, in the transmission data generation unit 110 shown in FIG. 7, the multi-view stream configuration information (multiview_stream_configuration_info( )) as view configuration information is inserted into the layer of a video stream. For this reason, a reception side may perform an appropriate and efficient process for causing a three-dimensional image (stereoscopic image) formed by image data of a plurality of views to be observed with the naked eyes, based on the view configuration information.

Further, in the transmission data generation unit 110 shown in FIG. 7, the multi-view stream configuration descriptor (multiview_stream_configuration_descriptor) is inserted into the layer of the transport stream TS. This descriptor forms identification information for identifying whether or not view configuration information is inserted into a layer of a video stream. A reception side easily identifies whether or not view configuration information is inserted into the layer of a video stream based on the identification information. For this reason, it is possible to efficiently extract the view configuration information from the user data area of the video stream.

In addition, in the transmission data generation unit 110 shown in FIG. 7, the disparity data generation portion 116 generates disparity data between respective views, and a disparity stream obtained by coding the disparity data is included in the transport stream TS along with a video stream. For this reason, the reception side may easily interpolate and synthesize image data of each view which is not transmitted, based on the transmitted disparity data, without performing a process of generating disparity data from the received image data of each view.

"Configuration Example of Receiver"

Figure 27:
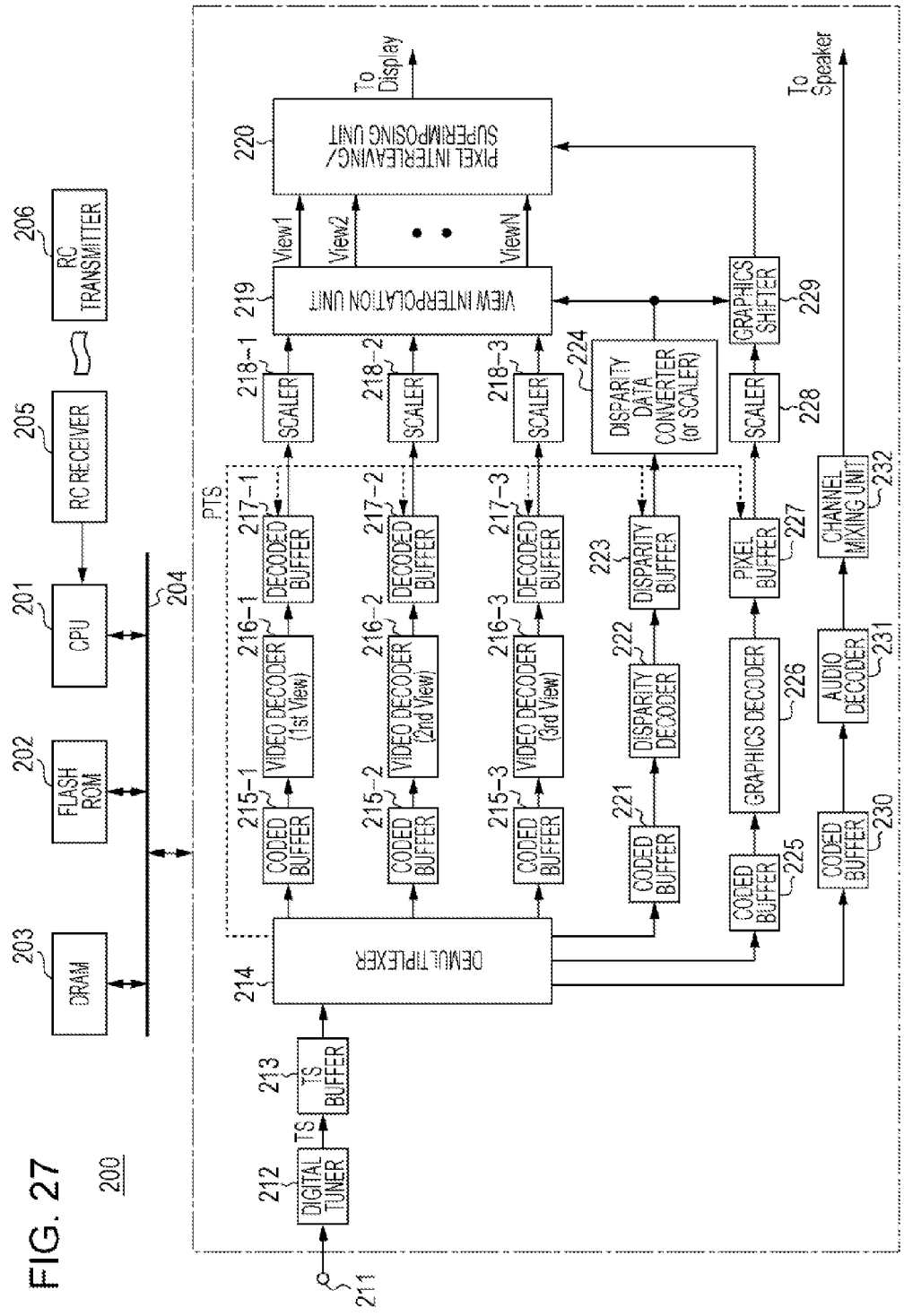
FIG. 27 is a block diagram illustrating a configuration example of a receiver constituting an image transmitting and receiving system.

FIG. 27 illustrates a configuration example of a receiver 200. The receiver 200 includes a CPU 201, a flash ROM 202, a DRAM 203, an internal bus 204, a remote control receiving unit (RC receiving unit) 205, and a remote control transmitter (RC transmitter) 206. Moreover, the receiver 200 includes an antenna terminal 211, a digital tuner 212, a transport stream buffer (TS buffer) 213, and a demultiplexer 214.

Further, the receiver 200 includes coded buffers 215-1, 215-2 and 215-3, video decoders 216-1, 216-2, and 216-3, decoded buffers 217-1, 217-2, and 217-3, and scalers 218-1, 218-2, and 218-3. Further, the receiver 200 includes a view interpolation unit 219, and a pixel interleaving/superimposing unit 220. Further, the receiver 200 includes a coded buffer 221, a disparity decoder 222, a disparity buffer 223, and a disparity data conversion unit 224.

Further, the receiver 200 includes a coded buffer 225, a graphics decoder 226, a pixel buffer 227, a scaler 228, and a graphics shifter 229. Moreover, the receiver 200 includes a coded buffer 230, an audio decoder 231, and a channel mixing unit 232.

The CPU 201 controls operations of each component of the receiver 200. The flash ROM 202 stores control software and saves data. The DRAM 203 forms a work area of the CPU 201. The CPU 201 develops software and data that are read from the flash ROM 202 on the DRAM 203 to activate the software, and controls each component of the receiver 200. The RC receiving unit 205 receives a remote control signal (remote control code) transmitted from the RC transmitter 206 to supply to the CPU 201. The CPU 201 controls each component of the receiver 200 based on the remote control code. The CPU 201, the flash ROM 202 and the DRAM 203 are connected to the internal bus 204.

The antenna terminal 211 is a terminal that inputs a television broadcast signal received in the receiving antenna (not shown). The digital tuner 212 processes the television broadcast signal input in the antenna terminal 211 and outputs a predetermined transport stream (bit stream data) TS corresponding to a selection channel of the user. The transport stream buffer (TS buffer) 213 temporarily accumulates transport stream TS output from the digital tuner 212.

The transport stream TS includes a video stream obtained by coding image data of at least a left view and a right view, and image data of a center view as an intermediate view located between the left view and the right view, among a plurality of views for stereoscopic image display.

In this case, any one of three video streams, two video streams, or one video stream may be included in the transport stream TS (refer to FIG. 24, FIG. 25, and FIG. 26). Here, for simplicity of explanation, explanation is given assuming that three video streams obtained by coding image data of each of a center view, a left view and a right view as a single picture are included in the transport stream TS.

As mentioned above, in this transport stream TS, multiview_stream_configuration_descriptor is inserted under PMT, or under EIT. This descriptor is identification information for identifying whether or not view configuration information, that is, multiview_stream_configuration_ info( ) is inserted into a layer of the video stream.

The demultiplexer 214 extracts respective elementary streams of video, disparity, graphics and audio from the transport stream TS that is temporarily accumulated in the TS buffer 213. Further, the demultiplexer 214 extracts the aforementioned multiview stream configuration descriptor from the transport stream TS and sends the extracted descriptor to the CPU 201. The CPU 201 may easily determine whether or not view configuration information is inserted in the layer of the video stream by one bit field of "multiview_stream_check_flag" of the descriptor.

The coded buffers 215-1, 215-2, and 215-3 temporarily accumulate video streams obtained by coding image data of each of a center view, a left view and a right view extracted in the demultiplexer 214 as a single picture. The video decoders 216-1, 216-2, and 216-3 respectively perform a decoding process on video streams that are respectively stored in the coded buffers 215-1, 215-2, and 215-3 based on the control of the CPU 201 and acquire each of image data of the center, left and right views.

Here, the video decoder 216-1 acquires image data of the center view. Further, the video decoder 216-2 acquires image data of the left view. Furthermore, the video decoder 216-3 acquires image data of the right view. In addition, in a case where two or more views are interleaved and coded, a coded buffer, a video decoder, a decoded buffer, and a scaler are allocated in a unit of a stream.

Each video decoder extracts multiview_stream_configuration_info( ) as a view configuration information that is inserted into a user data area of a picture header or a sequence header of the video stream and sends the extracted descriptor to the CPU 201. The CPU 201 performs an appropriate and efficient process in order to cause a three-dimensional image (stereoscopic image) formed of image data of a plurality of views to be observed with the naked eyes, based on the view configuration information.

That is, the CPU 201 controls operations of the demultiplexer 214, the video decoders 216-1, 216-2, and 216-3, the scalers 218-1, 218-2, and 218-3, the view interpolation unit 219, and the like, based on the view configuration information, in a unit of a picture or in a unit of a GOP. For example, the CPU 201 may identify whether or not the image data included in the video stream is image data of some views constituting 3D based on the one bit field of "3D_flag." Further, for example, the CPU 201 may recognize the number of views constituting 3D service based on the 4-bit field of "view_count".

Further, for example, the CPU 201 may identify whether or not data of a plurality of pictures is coded within one access unit of the video stream based on the one bit field of "single_view_es_flag." Further, for example, the CPU 201 may identify whether image data of two views in the video stream are interleaved and coded as data of a single picture based on the one bit field of "view_interleaving_flag."

Further, for example, the CPU 201 may recognize a view of which the image data is included in the video stream based on the four bit field of "view_allocation", when image data of two views in the video stream are not interleaved and coded as data of a single picture.

Further, for example, the CPU 201 may recognize a relative view position between two views in all views based on the three bit field of "view_pair_position_id", when image data of two views in the video stream are interleaved and coded as data of a single picture. Furthermore, at this time, the CPU 201 may know the type of interleaving based on the one bit field of "view_interleaving_type."

Further, for example, the CPU 201 may recognize a horizontal pixel ratio and a vertical pixel ratio of a decoded image with respect to full HD, based on the four bit field of "indication_of_picture_size_scaling_horizontal" and the four bit field of "indication_of_picture_size_scaling_vertical."

The decoded buffers 217-1, 217-2, and 217-3 temporarily accumulate image data of respective views respectively acquired in the video decoders 216-1, 216-2, and 216-3. The scalers 218-1, 218-2, and 218-3 respectively adjust such that an output resolution of image data of respective views that are output from the decoded buffers 217-1, 217-2, and 217-3 becomes a predetermined resolution.

The 4-bit field of "indication_of_picture_size_scaling_horizontal" for indicating the horizontal pixel ratio of a decoded image and the four bit field of "indication_of_picture_size_scaling_vertical" for indicating the vertical pixel ratio of a decoded image are present in multiview stream configuration information. The CPU 201 controls a scaling ratio of the scalers 218-1, 218-2, and 218-3 based on the pixel ratio information and obtains a predetermined resolution.

In this case, the CPU 201 calculates the scaling ratio with respect to the image data accumulated in the decoded buffer to instruct the scalers 218-1, 218-2, and 218-3, based on a resolution of the decoded image data, a resolution of a monitor, and the number of views. FIG. 28 illustrates a calculation example of the scaling ratio.

For example, in a case where the resolution of the decoded image data is 960*1080, the resolution of the monitor is 1920*1080, and the number of views to be displayed is 4, the scaling ratio becomes ½. Further, for example, in a case where the resolution of the decoded image data is 1920*1080, the resolution of the monitor is 1920*1080, and the number of views to be displayed is 4, the scaling ratio becomes ¼. Further, for example, in a case where the resolution of the decoded image data is 1920*2160, the resolution of the monitor is 3840*2160, and the number of views to be displayed is 8, the scaling ratio becomes ¼.

The coded buffer 221 temporarily accumulates the disparity stream extracted in the demultiplexer 214. The disparity decoder 222 performs a reverse process of the disparity encoder 117 (refer to FIG. 7) of the aforementioned transmission data generation unit 110. That is, the disparity decoder 222 performs the decoding process of the disparity stream stored in the coded buffer 221 to acquire the disparity data. The disparity data includes disparity data between the center view and the left view and disparity data between the center view and the right view. Further, the disparity data is disparity data in a unit of a pixel or in a unit of a block. The disparity buffer 223 temporarily accumulates the disparity data acquired in the disparity decoder 222.

The disparity data conversion unit 224 generates disparity data in a unit of a pixel that matches the size of image data after scaling, based on the disparity data accumulated in the disparity buffer 223. For example, in a case where the disparity data that is transmitted is in a unit of a block, the disparity data is converted into the disparity data in a unit of a pixel (refer to FIG. 11). Further, for example, in a case where the disparity data that is transmitted is in a unit of a pixel, but does not match the size of image data after scaling, the disparity data is appropriately scaled.

The view interpolation unit 219 performs an interpolation synthesis process on image data of a predetermined number of views that are not transmitted, based on the disparity data between respective views obtained in the disparity data conversion unit 224, from the image data of each view of a center view, a left view, and a right view after scaling. That is, the view interpolation unit 219 performs and outputs the interpolation synthesis on image data of each view located between the center view and the left view. Further, the view interpolation unit 219 performs and outputs the interpolation synthesis on image data of each view located between the center view and the right view.

Figure 29:
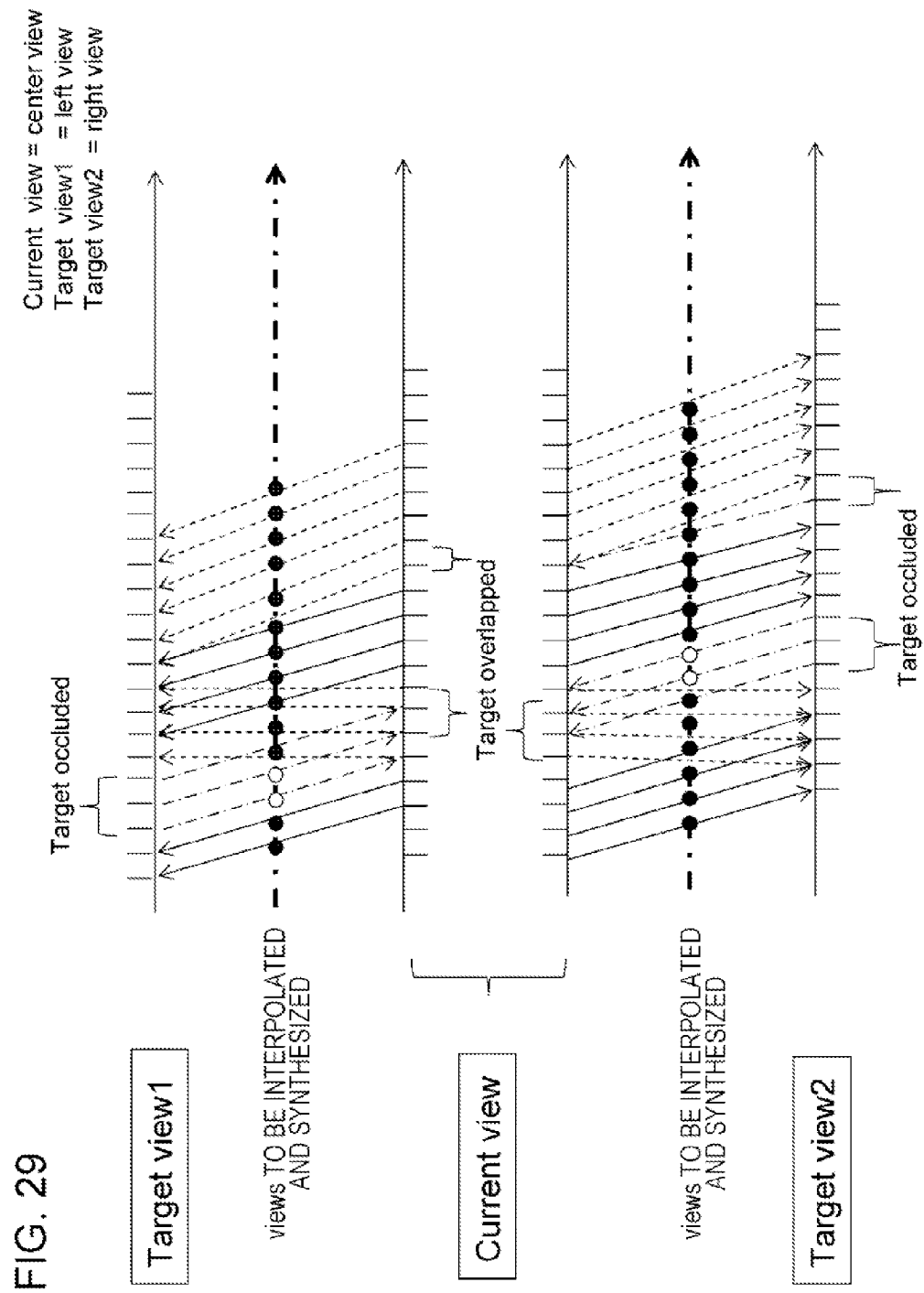
FIG. 29 is a diagram schematically illustrating an example of an interpolation synthesis process in a view interpolation unit.

FIG. 29 schematically illustrates an example of an interpolation synthesis in the view interpolation unit 219. In the illustrated example, for example, a current view corresponds to the aforementioned center view, a target view 1 corresponds to the aforementioned left view, and a target view 2 corresponds to the aforementioned right view.

The interpolation synthesis of views located between the current view and the target view 1 and the interpolation synthesis process of views located between the current view and the target view 2 are performed in the same manner. A description will be given below regarding the interpolation synthesis of views located between the current view and the target view 1.

The pixels of views located between the current view and the target view 1 and subjected to the interpolation and synthesis are allocated in the following manner. In this case, two-way disparity data including disparity data which indicates the target view 1 from the current view and, on the contrary, disparity data which indicates the current view from the target view 1 is used. First, a pixel of the current view is allocated as a pixel of a view to be subjected to an interpolation and synthesis by shifting disparity data as a vector (refer to the solid line arrows and the broken line arrows directed to the target view 1 from the current view and the black circles).

At this time, a pixel allocation is performed as follows in a part where a target is occluded in the target view 1. In other words, the pixel of the target view 1 is allocated as a pixel of a view to be subjected to an interpolation and synthesis by shifting disparity data as a vector (refer to the dot chain line arrows directed to the current view from the target view 1 and the white circles).

In this manner, since the part where a target is occluded has the two-way disparity data, the pixel of the view to be subjected to an interpolation and synthesis is filled with a pixel from a view which is regarded as a background. In addition, an occlusion area which may not be handled in a two-way manner is filled with a value through a post-process.

In addition, the target overlapped part where the tip ends of the shown arrows are overlapped is a part where shifts due to disparity are overlapped in the target view 1. In this part, which one of the two disparities corresponds to a foreground of the current view is determined from a value of the disparity data and is selected. In this case, a smaller value is mainly selected.

Referring to FIG. 27 again, the coded buffer 225 temporarily accumulates the graphics stream extracted by the demultiplexer 214. The graphics decoder 226 performs an inverse process to the graphics encoder 119 (refer to FIG. 7) of the above-described transmission data generation unit 110. In other words, the graphics decoder 226 performs a decoding process on the graphics stream stored in the coded buffer 225 and obtains decoded graphics data (including subtitle data). In addition, the graphics decoder 226 generates bitmap data of graphics superimposed on a view (image) on the basis of the graphics data.

The pixel buffer 227 temporarily accumulates the bitmap data of graphics generated by the graphics decoder 226. The scaler 228 adjusts the size of the bitmap data of graphics accumulated in the pixel buffer 227 to correspond to the size of the scaled image data. The graphics shifter 229 performs a shift process on the bitmap data of graphics of which the size has been adjusted on the basis of the disparity data obtained by the disparity data conversion unit 224. In addition, the graphics shifter 229 generates N bitmap data items of graphics which are respectively superimposed on image data of N views (View 1, View 2, . . . , and View N) output from the view interpolation unit 219.

The pixel interleaving/superimposing unit 220 superimposes the respectively corresponding bitmap data items of graphics on image data of the N views (View 1, View 2, . . . , and View N) which are output from the view interpolation unit 219. In addition, the pixel interleaving/superimposing unit 220 performs a pixel interleaving process on image data of the N views (View 1, View 2, . . . , and View N) and generates display image data for observing a three-dimensional image (stereoscopic image) with the naked eye.

The coded buffer 230 temporarily accumulates the audio stream extracted by the demultiplexer 214. The audio decoder 231 performs an inverse process to the audio encoder 121 (refer to FIG. 7) of the above-described transmission data generation unit 110. In other words, the audio decoder 231 performs a decoding process on the audio stream stored in the coded buffer 230 and obtains decoded audio data. The channel mixing unit 232 generates and outputs audio data of each channel in order to realize, for example, 5.1-channel surround, in relation to the audio data obtained by the audio decoder 231.

In addition, reading of the image data of each view from the decoded buffers 217-1, 217-2 and 217-2, reading of the disparity data from the disparity buffer 223, and reading of the bitmap data of graphics from the pixel buffer 227 are performed based on the PTS, and thus synchronous transmission is performed.

Operation of the receiver 200 will be briefly explained. A television broadcast signal input to an antenna terminal 211 is supplied to a digital tuner 212. The digital tuner 212 processes the television broadcast signal and outputs a predetermined transport stream TS corresponding to a selection channel of the user. The transport stream TS is temporarily accumulated in a TS buffer 213.

The transport stream TS includes a video stream obtained by coding image data of a left view and a right view and image data of a center view as an intermediate view located between the left view and the right view, among a plurality of views for stereoscopic image display.

The demultiplexer 214 extracts each of elementary streams of video, disparity, graphics, and audio from the transport stream TS which is temporarily accumulated in the TS buffer 213. In addition, the demultiplexer 214 extracts the multi-view stream configuration descriptor as identification information from the transport stream TS and sends the extracted descriptor to the CPU 201. The CPU 201 may easily determine whether or not view configuration information is inserted into the layer of the video stream on the basis of the 1-bit field of "multiview_stream_checkflag" of the descriptor.

The image data of each of the center, left and right views which is extracted by the demultiplexer 214 is supplied to the coded buffers 215-1, 215-2 and 215-3 to be temporarily accumulated. In addition, the video decoders 216-1, 216-2 and 216-3 respectively perform a decoding process on the video streams stored in the coded buffers 215-1, 215-2 and 215-3 under the control of the CPU 201 to acquire image data of each of the center, left and right views.

Further, each video decoder extracts the multi-view stream configuration information (multiview_stream_configuration_info( )) which is view configuration information and is inserted into the user data area or the like of the picture header or the sequence header of the video stream and sends the extracted descriptor to the CPU 201. The CPU 201 controls operations of the demultiplexer 214, the video decoders 216-1, 216-2, and 216-3, the scalers 218-1, 218-2, and 218-3, view interpolation unit 219 and the like based on the view configuration information in a unit of a picture or a unit of a GOP.

The image data of the respective views acquired in the video decoders 216-1, 216-2 and 216-3 is respectively supplied to and temporarily accumulated in the decoded buffers 217-1, 217-2 and 217-3. The scalers 218-1, 218-2 and 218-3 respectively adjust such that output resolutions of the image data of the respective views output from the decoded buffers 217-1, 217-2 and 217-3 become predetermined resolutions.

Further, the disparity stream extracted in the demultiplexer 214 is supplied to and temporarily accumulated in the coded buffer 221. The disparity decoder 222 performs a decoding process on the disparity stream stored in the coded buffer 221 and obtains disparity data. The disparity data includes disparity data between the center view and the left view and disparity data between the center view and the right view. Furthermore, this disparity data is disparity data in a unit of a pixel or a unit of a block.

The disparity data acquired in the disparity decoder 222 is supplied to and temporarily accumulated in the disparity buffer 223. The disparity data conversion unit 224 generates disparity data in a unit of a pixel that matches the size of the scaled image data based on the disparity data accumulated in the disparity buffer 223. In this case, when transmitted disparity data is in a unit of a block, the data is converted into disparity data in a unit of a pixel. Further, in this case, when the transmitted disparity data is in a unit of a pixel but does not match the size of scaled image data, the data is appropriately scaled.

The view interpolation unit 219 interpolates and synthesizes image data of a predetermined number of views which are not transmitted, based on the disparity data between the respective views obtained in the disparity data conversion unit 224, from the image data of each of the center, left and right views that are scaled. N views (View 1, View 2, . . . , and View N) for causing a three-dimensional image (stereoscopic image) to be observed with the naked eye are obtained from the view interpolation unit 219. In addition, image data of each of the center, left and right views is also included.

The graphics stream extracted in the demultiplexer 214 is supplied to and temporarily accumulated in the coded buffer 225. The graphics decoder 226 performs a decoding process on the graphics stream stored in the coded buffer 225 and obtains decoded graphics data (including subtitle data). Further, the graphics decoder 226 generates bitmap data of graphics superimposed on a view (image) based on the graphics data.

The bitmap data of graphics generated in the graphics decoder 226 is supplied to and temporarily accumulated in the pixel buffer 227. The scaler 228 adjusts such that the size of the bitmap data of graphics accumulated in the pixel buffer 227 matches the size of the scaled image data.

The graphics shifter 229 performs a shift process on the bitmap data of graphics of which the size is adjusted, based on the disparity data obtained in the disparity data conversion unit 224. In addition, the graphics shifter 229 generates bitmap data of N graphics which are respectively superimposed on the image data of the N views (View 1, View 2, . . . , and View N) output from the view interpolation unit 219, to supply to the pixel interleaving/superimposing unit 220.

The pixel interleaving/superimposing unit 220 superimposes the bitmap data of the respectively corresponding graphics on the image data of the N views (View 1, View 2, . . . , and View N). In addition, the pixel interleaving/superimposing unit 220 performs a pixel interleaving process on the image data of the N views (View 1, View 2, . . . , and View N) to generate display image data for causing a three-dimensional image (stereoscopic image) to be observed with the naked eye. The display image data is supplied to a display, and image display is performed in order to cause a three-dimensional image (stereoscopic image) to be observed with the naked eye.

The audio stream extracted in the demultiplexer 214 is supplied to and temporarily accumulated in the coded buffer 230. The audio decoder 231 performs a decoding process on the audio stream stored in the coded buffer 230 and obtains decoded audio data. The audio data is supplied to the channel mixing unit 232. The channel mixing unit 232 generates audio data of each channel in order to realize, for example, 5.1-channel surround with respect to the audio data. The audio data is supplied to, for example, a speaker to be an audio output adapted to image display.

As described above, the receiver 200 shown in FIG. 27 receives image data of at least a left view and a right view and image data of an intermediate view located between the left view and the right view, among a plurality of views for stereoscopic image display. Then, in the receiver 200, other views are obtained through an interpolation process based on disparity data. For this reason, it is possible to cause a stereoscopic image due to a multiview configuration to be efficiently observed with the naked eyes.

That is, since not only the image data of the left view and the right view, but also the image data of the center view is transmitted, a relative disparity between views is small, an interpolation becomes easy around an occlusion accompanied by a processing of a small part when image data of other views that are not transmitted is interpolated, and thereby it is possible to improve the quality of a reproduced image. Further, the image data of the left view and the right view is transmitted, the interpolation of the image data of the views that are not transmitted may be synthesized through an entire interpolation process, and thus maintaining a high quality regarding the endpoint processing such as the occlusion becomes easy.

In addition, the receiver 200 shown in FIG. 27 illustrates a configuration example in which a disparity stream obtained by coding the disparity data is included in the transport stream TS. In a case where the disparity stream is not included in the transport stream TS, disparity data is generated from image data of each of views that are received and used.

Figure 30:
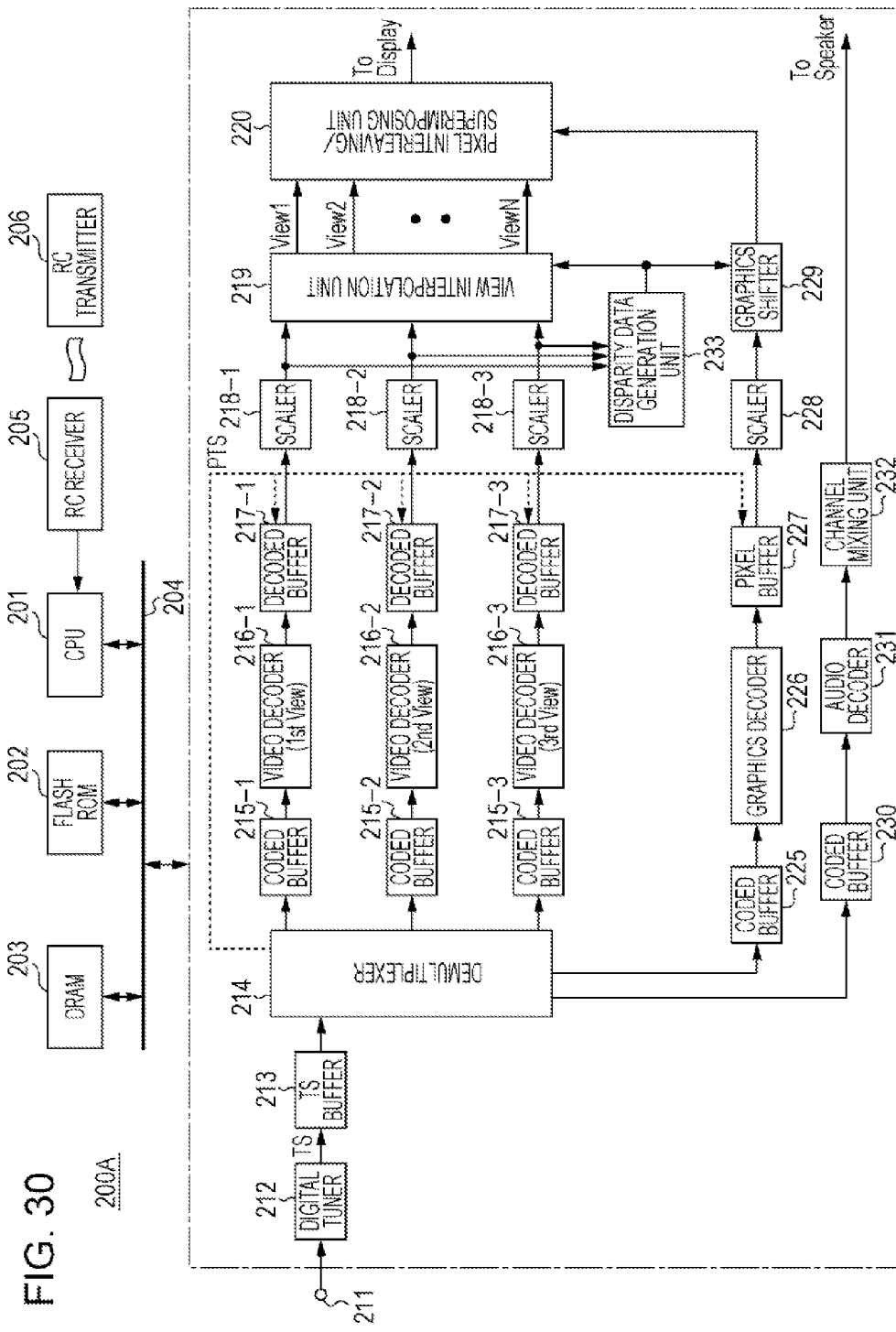
FIG. 30 is a block diagram illustrating another configuration example of a receiver constituting an image transmitting and receiving system.
Figure 31:
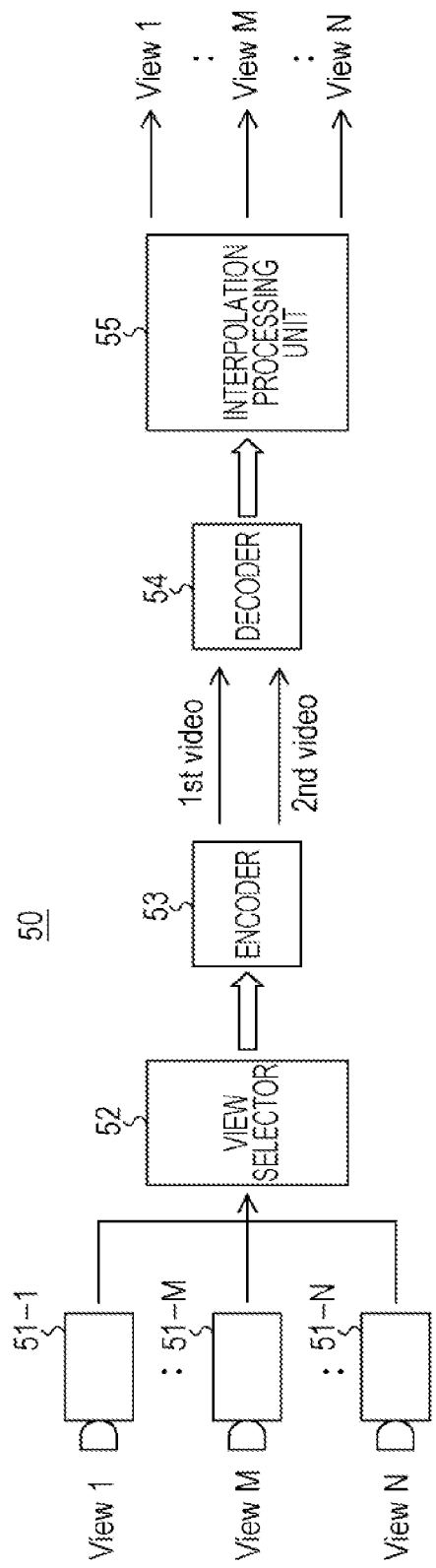
FIG. 31 is a diagram illustrating a configuration example of an image transmitting and receiving system which enables a three-dimensional image (stereoscopic image) to be observed with the naked eyes.
Figure 32:
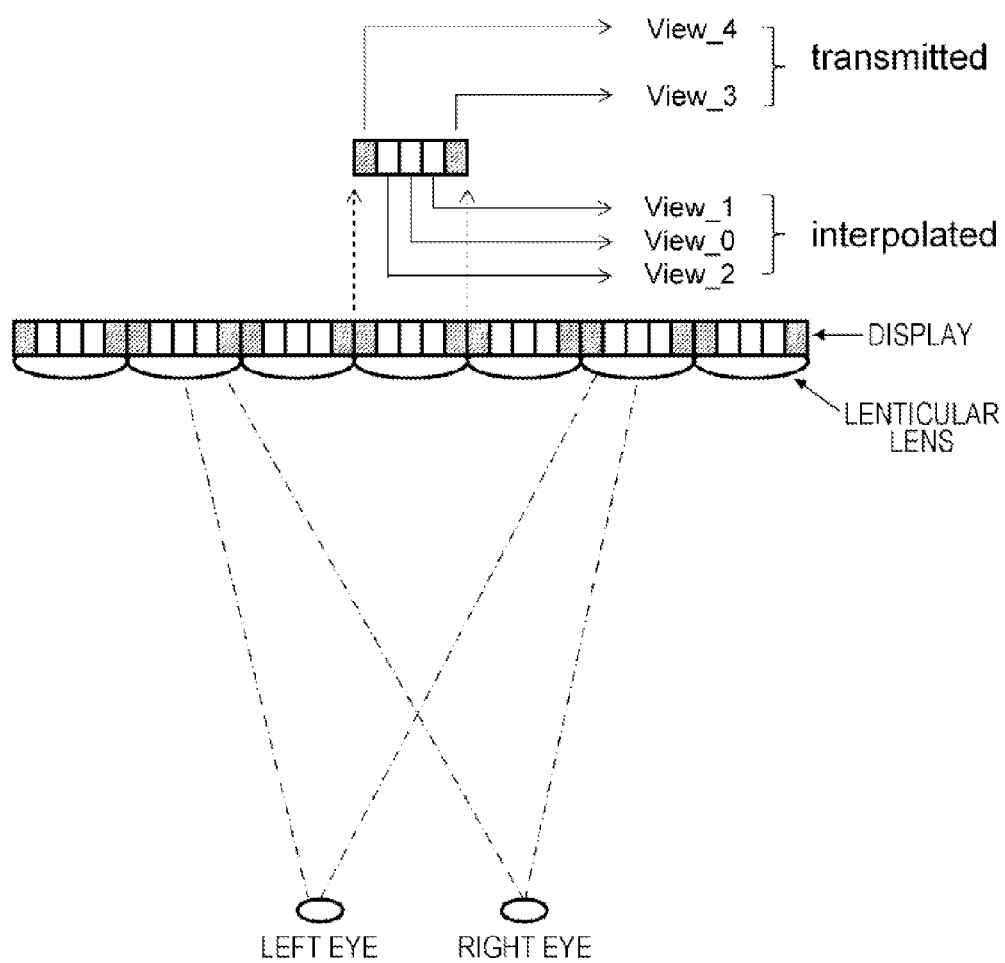
FIG. 32 is a diagram schematically illustrating a display of a reception side, in a case where the number of views is 5, in a method of transmitting image data of two views at both ends among N views.
Figure 33:
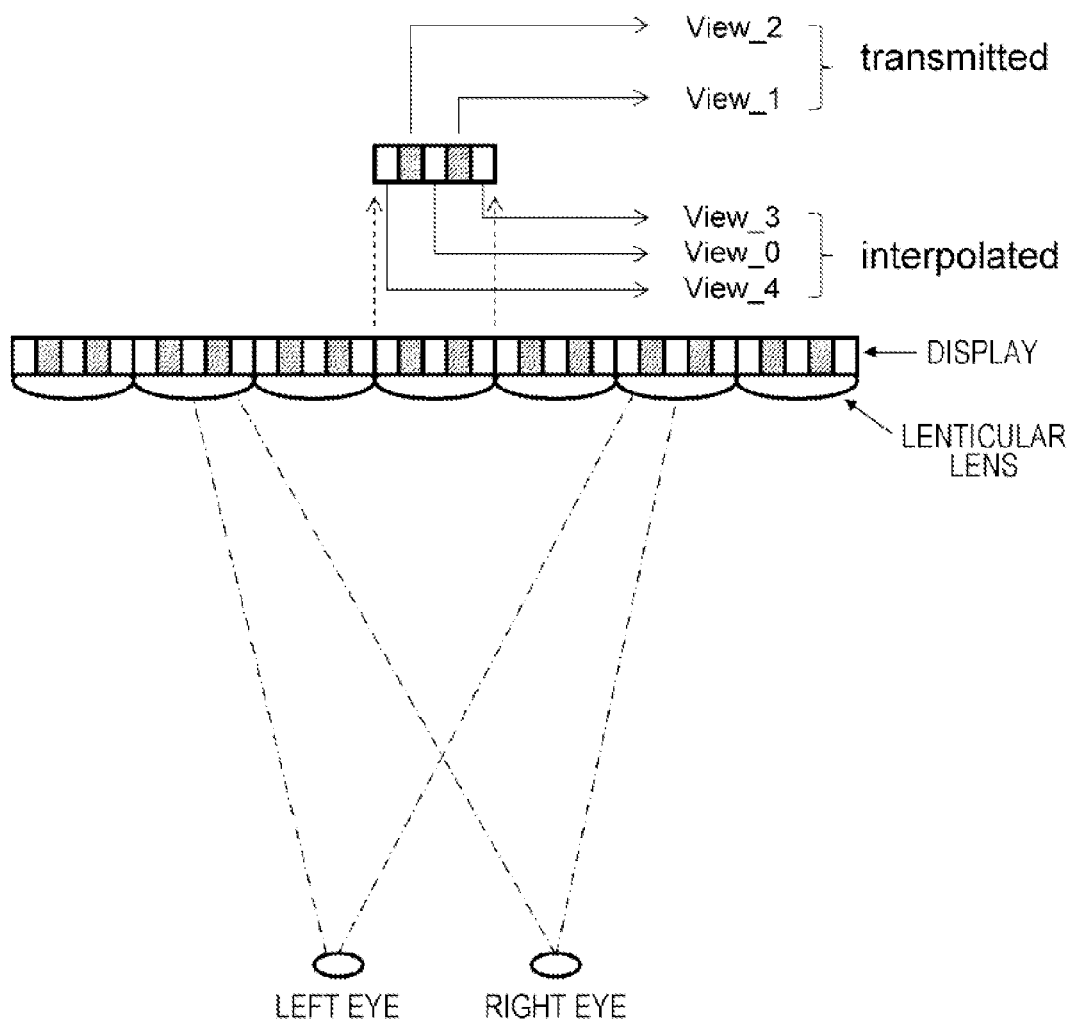
FIG. 33 is a diagram schematically illustrating a display of the reception side, in a case where the number of views is 5, in a method of transmitting image data of two views located inward among N views.

FIG. 30 illustrates a configuration example of a receiver 200A in that case. In FIG. 30, the components corresponding to those of FIG. 27 are denoted by the same reference numerals, and thus the detailed explanation thereof will be omitted. The receiver 200A has a disparity data generation unit 233. The disparity data generation unit 233 generates disparity data based on image data of respectively a center view, a left view, and a right view that are scaled.

The detailed description is omitted, but a disparity data generating method in this case is the same as the disparity data generating method of the disparity data generation unit 116 in the aforementioned transmission data generation unit 110. In addition, the disparity data generation unit 233 generates and outputs the same disparity data as the disparity data in a unit of a pixel generated in the disparity data conversion unit 224 of the receiver 200 shown in FIG. 27. The disparity data generated in the disparity data generation unit 233 is supplied to the view interpolation unit 219 and the graphics shifter 229 and used therein.

In addition, the receiver 200A shown in FIG. 30 is configured by omitting the coded buffer 221, the disparity decoder 222, the disparity buffer 223 and the disparity data conversion unit 224 from the receiver 200 shown in FIG. 27. The other configurations of the receiver 200A shown in FIG. 30 are the same as the configuration of the receiver 200 shown in FIG. 27.

2. Modification Example

In addition, although the aforementioned embodiment illustrates the image transmitting and receiving system 10 configured of the broadcasting station 100 and the receiver 200, the configuration of the image transmitting and receiving system to which the present technology may be applied is not limited thereto. For example, a part of the receiver 200 may have a configuration of a set top box and a monitor that are connected through a digital interface such as for example, a high-definition multimedia interface (HDMI).

Moreover, the aforementioned embodiment illustrates an example in which the container is the transport stream (MPEG-2 TS). In the same manner, the present technology may be applied to a system which has a configuration to be distributed to the receiving terminal over a network such as the internet. The distribution over the internet is mainly performed with a container that has a format of MP4 or other formats. That is, the container corresponds to a container of various formats such as a transport stream (MPEG-2TS) employing a digital broadcasting standard, and MP4 used in internet distribution.

Further, the present technology may have following configurations.

(1) A transmission device comprising:
an image data acquisition unit that acquires image data of at least a left view and a right view, and image data of an intermediate view located between the left view and the right view, among a plurality of views for stereoscopic image display; and an image data transmitting unit that transmits a container which has a predetermined format and includes a video stream obtained by coding the acquired image data.

(2) The transmission device set forth in (1), further comprising: a view configuration information insertion unit that inserts view configuration information regarding image data in the video stream, into a layer of the video stream.

(3) The transmission device set forth in (2), further comprising: an identification information insertion unit that inserts identification information for identifying whether or not the view configuration information is inserted into the layer of the video stream, into a layer of the container.

(4) The transmission device set forth in any one of (1) to (3), wherein in the video stream included in the container, image data of the left view and the right view is respectively coded as data of a single picture.

(5) The transmission device set forth in any one of (1) to (3), wherein in the video stream included in the container, image data of the left view and the right view is interleaved and coded as data of a single picture.

(6) The transmission device set forth in any one of (1) to (5), wherein the video stream included in the container includes data of one or a plurality of pictures.

(7) The transmission device set forth in any one of (1) to (6), wherein when the video stream included in the container includes coded data of a plurality of pictures, information indicating a boundary between coded data of respective pictures is disposed.

(8) The transmission device set forth in (2), wherein when image data of a predetermined view is coded as data of a single picture in the video stream included in the container, information indicating a position of the predetermined view is included in the view configuration information inserted into the layer of the video stream.

(9) The transmission device set forth in (2) or (8), wherein when image data of two views is interleaved and coded as data of a single picture in the video stream included in the container, information indicating positions of the two views is included in the view configuration information inserted into the layer of the video stream.

(10) The transmission device set forth in (9), wherein information indicating a type of an interleaving process that is performed on the image data of the two views is included in the view configuration information.

(11) The transmission device set forth in any one of (2), (8) to (10), wherein information indicating whether or not data of a plurality of pictures is coded in one access unit of the video stream is included in the view configuration information inserted into the layer of the video stream.

(12) The transmission device set forth in any one of (2), (8) to (11), wherein information indicating whether or not image data of views required for image display is coded in the video stream is included in the view configuration information inserted into the layer of the video stream.

(13) The transmission device set forth in any one of (2), (8) to (12), wherein pixel ratio information regarding a predetermined horizontal and/or vertical resolution is included in the view configuration information inserted into the layer of the video stream.

(14) The transmission device set forth in any one of (1) to (13), wherein the transmission device further comprises a disparity data acquisition unit that acquires disparity data between the respective views, wherein the image data transmitting unit transmits a container which has a predetermined format and includes a disparity stream obtained by coding the acquired disparity data, in addition to a video stream obtained by coding the acquired image data.

(15) The transmission device set forth in any one of (1) to (14), wherein the container is a transport stream.

(16) A transmission method comprising: an image data acquisition step of acquiring image data of at least a left view and a right view, and image data of an intermediate view located between the left view and the right view, among a plurality of views for stereoscopic image display; and an image data transmitting step of transmitting a container which has a predetermined format and includes a video stream obtained by coding the acquired image data.

(17) A reception device comprising: an image data receiving unit that receives a container which has a predetermined format and includes a video stream obtained by coding image data of at least a left view and a right view, and image data of an intermediate view located between the left view and the right view, among a plurality of views for stereoscopic image display; an image data acquisition unit that acquires image data of respective views by decoding the video stream included in the container; and an interpolation process unit that acquires image data of a predetermined number of views located between the respective views through an interpolation process, based on disparity data between the respective views.

(18) The reception device set forth in (17), wherein the container includes a disparity stream obtained by coding the disparity data, and wherein the reception device further comprises a disparity data acquisition unit that acquires the disparity data by decoding the disparity stream included in the container.

(19) The reception device set forth in (17), further comprising a disparity data generation unit that generates the disparity data, based on image data of the respective views obtained by the image data acquisition unit.

(20) A reception method comprising: an image data receiving step of receiving a container which has a predetermined format and includes a video stream obtained by coding image data of at least a left view and a right view, and image data of an intermediate view located between the left view and the right view, among a plurality of views for stereoscopic image display; an image data acquisition step of acquiring image data of respective views by decoding the video stream included in the container; and an interpolation process step of acquiring image data of a predetermined number of views located between the respective views through an interpolation process, based on disparity data between the respective views.

The main feature of the present technology consists of image data of at least a left view and a right view and image data of an intermediate view located between the left view and the right view, among a plurality of views for stereoscopic image display being transmitted in order to cause a three-dimensional image (stereoscopic image) to be observed with the naked eyes, thereby it being possible to achieve an effective transmission of image data while suppressing the transmission bandwidth and improving quality of a reproduced image (refer to FIG. 6).

REFERENCE SIGNS LIST

10 image transmitting and receiving system
100 broadcasting station
110 transmission data generation unit
111-1 to 111-N image data output unit
112 view selector
113-1, 113-2, 113-3 scaler
114-1, 114-2, 114-3 video encoder
115 multiplexer
116 disparity data generation unit
117 disparity encoder
118 graphics data output unit
119 graphics encoder
120 audio data output unit
121 audio encoder
200, 200A receiver
201 CPU
211 antenna terminal
212 digital tuner
213 transport stream buffer (TSbuffer)
214 demultiplexer
215-1, 215-2, 215-3, 221, 225, 230 coded buffer
216-1, 216-2, 216-3 video decoder
217-1, 217-2, 217-3 view buffer
218-1, 218-2, 218-3, 228 scaler
219 view interpolation unit
220 pixel interleaving/superimposing unit
222 disparity decoder
223 disparity buffer
224 disparity data conversion unit
226 graphics decoder
227 pixel buffer
229 graphics shifter
231 audio decoder
232 channel mixing unit
233 disparity data generation unit

The invention claimed is:

1. A transmission device comprising:
a processing device configured to:
acquire image data of at least a left view and a right view, and image data of an intermediate view located between the left view and the right view, among a plurality of views for stereoscopic image display;
transmit a container which has a predetermined format and includes a video stream obtained by coding the acquired image data;
insert view configuration information regarding image data in the video stream, into a layer of the video stream, in which the view configuration information describes view allocation of views of the image data included in the video stream,
in which the view allocation indicates a first location of at least one first view of the views of the image data included in the video stream relative to a center view for the image data included in the video stream; and
insert identification information for identifying whether or not the view configuration information is inserted into the layer of the video stream into a layer of the container,
in which a first value is inserted as the identification information when the view configuration information is inserted into the layer of the video stream, and in which a second value different from the first value is inserted as the identification information when the view configuration information is not inserted into the layer of the video stream.

2. The transmission device according to claim 1,
wherein in the video stream included in the container, image data of the left view and the right view is respectively coded as data of a single picture.

3. The transmission device according to claim 1,
wherein in the video stream included in the container, image data of the left view and the right view is interleaved and coded as data of a single picture.

4. The transmission device according to claim 1,
wherein the video stream included in the container includes data of one or a plurality of pictures.

5. The transmission device according to claim 1,
wherein when the video stream included in the container includes coded data of a plurality of pictures, information indicating a boundary between coded data of respective pictures is disposed.

6. The transmission device according to claim 1,
wherein when image data of a predetermined view is coded as data of a single picture in the video stream included in the container, information indicating a position of the predetermined view is included in the view configuration information inserted into the layer of the video stream.

7. The transmission device according to claim 1,
wherein when image data of two views is interleaved and coded as data of a single picture in the video stream included in the container, information indicating positions of the two views is included in the view configuration information inserted into the layer of the video stream.

8. The transmission device according to claim 7,
wherein information indicating a type of an interleaving process that is performed on the image data of the two views is included in the view configuration information.

9. The transmission device according to claim 1,
wherein information indicating whether or not data of a plurality of pictures is coded in one access unit of the video stream is included in the view configuration information inserted into the layer of the video stream.

10. The transmission device according to claim 1,
wherein information indicating whether or not image data of views required for image display is coded in the video stream is included in the view configuration information inserted into the layer of the video stream.

11. The transmission device according to claim 1,
wherein pixel ratio information regarding at least one of a predetermined horizontal or vertical resolution is included in the view configuration information inserted into the layer of the video stream.

12. The transmission device according to claim 1, wherein the processing device is configured to:
acquire disparity data between the respective views, and transmit a second container which has a second predetermined format and includes a disparity stream obtained by coding the acquired disparity data, in addition to the video stream obtained by coding the acquired image data.

13. The transmission device according to claim 1, wherein the container is a transport stream.

14. A transmission method comprising:
an image data acquisition step of acquiring, by a processing device, image data of at least a left view and a right view, and image data of an intermediate view located between the left view and the right view, among a plurality of views for stereoscopic image display;
an image data transmitting step of transmitting, by the processing device, a container which has a predetermined format and includes a video stream obtained by coding the acquired image data; and
inserting, by the processing device, view configuration information regarding image data in the video stream, into a layer of the video stream, in which the view configuration information describes view allocation of views of the image data included in the video stream,
in which the view allocation indicates a first location of at least one first view of the views of the image data included in the video stream relative to a center view for the image data included in the video stream,
inserting identification information for identifying whether or not the view configuration information is inserted into the layer of the video stream into a layer of the container,
in which a first value is inserted as the identification information when the view configuration information is inserted into the layer of the video stream, and in which a second value different from the first value is inserted as the identification information when the view configuration information is not inserted into the layer of the video stream.

15. A reception device comprising:
a processing device configured to:
receive a container which has a predetermined format and includes a video stream obtained by coding image data of at least a left view and a right view, and image data of an intermediate view located between the left view and the right view, among a plurality of views for stereoscopic image display;
acquire image data of respective views by decoding the video stream included in the container; and
acquire image data of a predetermined number of views located between at least one first view and at least one second view of the respective views through an interpolation process, based on two-way disparity data for the at least one first view and the at least one second view, in which the two-way disparity data is used in the interpolation process based on whether a part of one view of the at least one first view and the at least one second view, as a target view, is occluded,
in which when the part of the one view is occluded, image data of the at least one first view and the at least one second view serving as a background is used by the interpolation process in an interpolation view located between the at least one first view and the at least one second view.

16. The reception device according to claim 15, wherein the container includes a disparity stream obtained by coding the disparity data, and
wherein the processing device is further configured to acquire the two-way disparity data by decoding the disparity stream included in the container.

17. The reception device according to claim 15, wherein the processing device is configured to generate the two-way disparity data, based on image data of the respective views obtained by the processing device.

18. A reception method comprising:
an image data receiving step of receiving, by a processing device, a container which has a predetermined format and includes a video stream obtained by coding image data of at least a left view and a right view, and image data of an intermediate view located between the left view and the right view, among a plurality of views for stereoscopic image display;
an image data acquisition step of acquiring, by the processing device, image data of respective views by decoding the video stream included in the container; and
an interpolation process step of acquiring, by the processing device, image data of a predetermined number of views located between at least one first view and at least one second view of the respective views through an interpolation process, based on two-way disparity data for the at least one first view and the at least one second view,
in which the two-way disparity data is used in the interpolation process based on whether a part of one view of the at least one first view and the at least one second view, as a target view, is occluded, and
in which when the part of the one view is occluded, image data of the at least one first view and the at least one second view serving as a background is used by the interpolation process in an interpolation view located between the at least one first view and the at least one second view.

* * * * *